US011978472B2

(12) United States Patent
Fu et al.

(10) Patent No.: US 11,978,472 B2
(45) Date of Patent: *May 7, 2024

(54) SYSTEMS AND METHODS FOR PROCESSING AND PRESENTING CONVERSATIONS

(71) Applicant: Otter.ai, Inc., Los Altos, CA (US)

(72) Inventors: Yun Fu, Cupertino, CA (US); Simon Lau, San Jose, CA (US); Kaisuke Nakajima, Sunnyvale, CA (US); Julius Cheng, Cupertino, CA (US); Gelei Chen, Mountain View, CA (US); Sam Song Liang, Palo Alto, CA (US); James Mason Altreuter, Belmont, CA (US); Kean Kheong Chin, Santa Clara, CA (US); Zhenhao Ge, Sunnyvale, CA (US); Hitesh Anand Gupta, Santa Clara, CA (US); Xiaoke Huang, Foster City, CA (US); James Francis McAteer, San Francisco, CA (US); Brian Francis Williams, San Carlos, CA (US); Tao Xing, San Jose, CA (US)

(73) Assignee: Otter.ai, Inc., Los Altos, CA (US)

( * ) Notice: Subject to any disclaimer, the term of this patent is extended or adjusted under 35 U.S.C. 154(b) by 354 days.

This patent is subject to a terminal disclaimer.

(21) Appl. No.: 17/210,108

(22) Filed: Mar. 23, 2021

(65) Prior Publication Data
US 2021/0327454 A1  Oct. 21, 2021

Related U.S. Application Data

(63) Continuation of application No. 16/276,446, filed on Feb. 14, 2019, now Pat. No. 11,100,943, which is a
(Continued)

(51) Int. Cl.
*G10L 21/00* (2013.01)
*G06F 16/438* (2019.01)
(Continued)

(52) U.S. Cl.
CPC .......... *G10L 21/10* (2013.01); *G06F 16/438* (2019.01); *G10L 17/02* (2013.01); *G10L 17/04* (2013.01); *G10L 17/22* (2013.01); *H04L 63/104* (2013.01)

(58) Field of Classification Search
CPC ....... G10L 15/00; G10L 15/005; G10L 15/02; G10L 15/04; G10L 2015/086;
(Continued)

(56) References Cited

U.S. PATENT DOCUMENTS 6,088,669 A  7/2000 Maes
6,363,352 B1  3/2002 Dailey et al.
(Continued)

FOREIGN PATENT DOCUMENTS

JP  3376487  5/2001

OTHER PUBLICATIONS

J. Basu et al., "An overview of speaker diarization: Approaches, resources and challenges," 2016 Conference of The Oriental Chapter of International Committee for Coordination and Standardization of Speech Databases and Assessment Techniques (O-COCOSDA), Bali, Indonesia, 2016, pp. 166-171. (Year: 2016).*
(Continued)

*Primary Examiner* — Edgar X Guerra-Erazo
(74) *Attorney, Agent, or Firm* — Faegre Drinker Biddle & Reath LLP

(57) ABSTRACT

A system for processing and presenting a conversation includes a sensor, a processor, and a presenter. The sensor is configured to capture an audio-form conversation. The processor is configured to automatically transform the audio-
(Continued)

form conversation into a transformed conversation. The transformed conversation includes a synchronized text, wherein the synchronized text is synchronized with the audio-form conversation. The presenter is configured to present the transformed conversation including the synchronized text and the audio-form conversation. The presenter is further configured to present the transformed conversation to be navigable, searchable, assignable, editable, and shareable.

14 Claims, 102 Drawing Sheets

Related U.S. Application Data continuation-in-part of application No. 16/027,511, filed on Jul. 5, 2018, now Pat. No. 10,978,073.

(60) Provisional application No. 62/668,623, filed on May 8, 2018, provisional application No. 62/631,680, filed on Feb. 17, 2018, provisional application No. 62/710,631, filed on Feb. 16, 2018, provisional application No. 62/530,227, filed on Jul. 9, 2017.

(51) Int. Cl.
*G10L 17/02* (2013.01)
*G10L 17/04* (2013.01)
*G10L 17/22* (2013.01)
*G10L 21/10* (2013.01)
*H04L 9/40* (2022.01)

(58) Field of Classification Search
CPC ..... G10L 15/16; G10L 15/1807; G10L 15/18; G10L 15/1815; G10L 15/1822; G10L 15/20; G10L 15/22; G10L 2015/221; G10L 15/222; G10L 2015/223; G10L 2015/225; G10L 15/30; G10L 15/32; G10L 15/34; G10L 17/00; G10L 17/04; G10L 17/08; G10L 17/14; G10L 17/18; G10L 17/20; G10L 17/24; G10L 17/22; G10L 17/26; G10L 21/003; G10L 21/013; G10L 2021/0135; H04M 2203/50; H04M 2203/5009; H04M 2203/5018; H04M 2203/5027; H04M 2203/5036; H04M 2203/5072; H04M 2203/5081; G06F 16/685; G06F 16/686
See application file for complete search history.

(56) References Cited

U.S. PATENT DOCUMENTS

| | | | |
|---|---|---|---|
| 6,434,520 B1 | 8/2002 | Kanevsky et al. | |
| 6,513,003 B1 | 1/2003 | Angell et al. | |
| 8,407,049 B2 * | 3/2013 | Cromack | G10L 15/26 704/7 |
| 8,612,211 B1 | 12/2013 | Shires et al. | |
| 9,571,652 B1 | 2/2017 | Zeppenfeld et al. | |
| 10,388,272 B1 | 8/2019 | Thomson et al. | |
| 10,573,312 B1 | 2/2020 | Thomson et al. | |
| 10,616,278 B1 | 4/2020 | Johansson et al. | |
| 10,630,733 B2 | 4/2020 | Modai et al. | |
| 10,978,073 B1 * | 4/2021 | Fu | G10L 15/26 |
| 11,012,575 B1 | 5/2021 | Leblang et al. | |
| 11,017,778 B1 | 5/2021 | Thomson et al. | |
| 11,024,316 B1 | 6/2021 | Fu et al. | |
| 11,100,943 B1 * | 8/2021 | Fu | H04M 3/567 |
| 11,222,185 B2 | 1/2022 | Waibel et al. | |
| 11,330,229 B1 | 5/2022 | Crumley et al. | |
| 11,423,911 B1 | 8/2022 | Fu et al. | |
| 11,431,517 B1 | 8/2022 | Fu et al. | |
| 11,657,822 B2 | 5/2023 | Fu et al. | |
| 11,676,623 B1 | 6/2023 | Younes et al. | |
| 2004/0107256 A1 | 6/2004 | Odenwald et al. | |
| 2004/0117446 A1 | 6/2004 | Swanson | |
| 2005/0034079 A1 | 2/2005 | Gunasekar et al. | |
| 2005/0152523 A1 | 7/2005 | Fellenstein et al. | |
| 2006/0149558 A1 | 7/2006 | Kahn et al. | |
| 2006/0182249 A1 | 8/2006 | Archambault et al. | |
| 2007/0071206 A1 | 3/2007 | Gainsboro et al. | |
| 2007/0106724 A1 | 5/2007 | Gorti et al. | |
| 2007/0118374 A1 | 5/2007 | Wise et al. | |
| 2007/0183458 A1 | 8/2007 | Bouazizi et al. | |
| 2008/0181417 A1 | 7/2008 | Pereg et al. | |
| 2008/0293443 A1 | 11/2008 | Pettinato | |
| 2008/0294434 A1 | 11/2008 | Pettinato | |
| 2009/0019367 A1 | 1/2009 | Cavagnari et al. | |
| 2009/0030680 A1 | 1/2009 | Mamou | |
| 2009/0210391 A1 | 8/2009 | Hall et al. | |
| 2009/0306981 A1 * | 12/2009 | Cromack | G06F 16/685 707/E17.103 |
| 2009/0307189 A1 | 12/2009 | Bobbitt et al. | |
| 2010/0146438 A1 | 6/2010 | Bush et al. | |
| 2011/0228922 A1 | 9/2011 | Dhara et al. | |
| 2011/0307241 A1 | 12/2011 | Waibel et al. | |
| 2011/0320197 A1 | 12/2011 | Conejero et al. | |
| 2012/0253805 A1 | 10/2012 | Rajakumar et al. | |
| 2012/0275761 A1 | 11/2012 | Li et al. | |
| 2012/0323575 A1 | 12/2012 | Gibbon et al. | |
| 2012/0324355 A1 | 12/2012 | Mbenkum et al. | |
| 2013/0300939 A1 | 11/2013 | Chou et al. | |
| 2013/0311177 A1 | 11/2013 | Bastide et al. | |
| 2013/0346077 A1 | 12/2013 | Mengibar et al. | |
| 2014/0029757 A1 | 1/2014 | Aronowitz et al. | |
| 2014/0136999 A1 | 5/2014 | Leibovich et al. | |
| 2015/0012844 A1 | 1/2015 | Paulik et al. | |
| 2015/0249747 A1 | 9/2015 | Box et al. | |
| 2015/0255068 A1 | 9/2015 | Kim et al. | |
| 2015/0310863 A1 | 10/2015 | Chen et al. | |
| 2016/0004732 A1 | 1/2016 | Hsu et al. | |
| 2016/0014222 A1 | 1/2016 | Chen et al. | |
| 2016/0284354 A1 | 9/2016 | Chen et al. | |
| 2016/0322049 A1 | 11/2016 | Bakshi et al. | |
| 2017/0070706 A1 | 3/2017 | Ursin et al. | |
| 2017/0169816 A1 | 6/2017 | Blandin et al. | |
| 2017/0294184 A1 | 10/2017 | Bradley | |
| 2017/0301037 A1 | 10/2017 | Baughman et al. | |
| 2018/0007060 A1 | 1/2018 | Leblang et al. | |
| 2018/0032226 A1 | 2/2018 | Ryu et al. | |
| 2018/0143956 A1 | 5/2018 | Skarbovsky et al. | |
| 2018/0174108 A1 | 6/2018 | Kang et al. | |
| 2018/0197548 A1 | 7/2018 | Palakodety et al. | |
| 2018/0316893 A1 | 11/2018 | Rosenberg et al. | |
| 2019/0073640 A1 | 3/2019 | Odezue et al. | |
| 2019/0273767 A1 | 9/2019 | Nelson et al. | |
| 2019/0341050 A1 | 11/2019 | Diamant et al. | |
| 2019/0364009 A1 | 11/2019 | Joseph et al. | |
| 2020/0145616 A1 | 5/2020 | Nassar | |
| 2020/0175961 A1 | 6/2020 | Thomson et al. | |
| 2020/0228358 A1 | 7/2020 | Rampton | |
| 2020/0243095 A1 | 7/2020 | Adlersberg et al. | |
| 2020/0365160 A1 | 11/2020 | Nassar et al. | |
| 2020/0403818 A1 | 12/2020 | Daredia et al. | |
| 2020/0412564 A1 | 12/2020 | Roedel et al. | |
| 2021/0021558 A1 | 1/2021 | Mahmoud et al. | |
| 2021/0044645 A1 | 2/2021 | Jayaweera | |
| 2021/0058263 A1 | 2/2021 | Fahrendorff et al. | |
| 2021/0058517 A1 | 2/2021 | Serbajlo et al. | |
| 2021/0092168 A1 | 3/2021 | Ranalli et al. | |
| 2021/0217420 A1 | 7/2021 | Fu et al. | |
| 2021/0319797 A1 | 10/2021 | Fu et al. | |
| 2021/0369042 A1 * | 12/2021 | Gustman | A47J 31/407 |
| 2021/0407520 A1 | 12/2021 | Neckermann et al. | |
| 2021/0409547 A1 | 12/2021 | Channapragada et al. | |

(56) References Cited

U.S. PATENT DOCUMENTS

2022/0343918 A1 10/2022 Fu et al.
2022/0353102 A1 11/2022 Lau et al.

OTHER PUBLICATIONS

United States Patent and Trademark Office, Office Action dated Jul. 14, 2022, in U.S. Appl. No. 17/195,202.
United States Patent and Trademark Office, Office Action dated Jun. 24, 2022, in U.S. Appl. No. 17/678,676.
United States Patent and Trademark Office, Office Action dated Oct. 14, 2022, in U.S. Appl. No. 17/678,676.
United States Patent and Trademark Office, Notice of Allowance dated Jan. 12, 2023, in U.S. Appl. No. 17/195,202.
United States Patent and Trademark Office, Office Action dated Dec. 8, 2022, in U.S. Appl. No. 17/242,465.
United States Patent and Trademark Office, Office Action dated Dec. 7, 2022, in U.S. Appl. No. 17/863,837.
United States Patent and Trademark Office, Office Action dated Dec. 7, 2022, in U.S. Appl. No. 17/863,881.
Tur et al., "The CALO Meeting Assistant System," *IEEE Transactions on Audio, Speech, and Language Processing*, vol. 18, No. 6, pp. 1601-1611, Aug. 2010.
United States Patent and Trademark Office, Office Action dated Sep. 8, 2021, in U.S. Appl. No. 16/598,820.
United States Patent and Trademark Office, Notice of Allowance dated Mar. 10, 2022, in U.S. Appl. No. 16/598,820.
United States Patent and Trademark Office, Notice of Allowance dated Apr. 14, 2022, in U.S. Appl. No. 16/598,820.
United States Patent and Trademark Office, Office Action dated Sep. 8, 2021, in U.S. Appl. No. 16/780,630.
United States Patent and Trademark Office, Notice of Allowance dated Feb. 11, 2022, in U.S. Appl. No. 16/780,630.
United States Patent and Trademark Office, Notice of Allowance dated Apr. 15, 2022, in U.S. Appl. No. 16/780,630.
United States Patent and Trademark Office, Office Action dated Feb. 23, 2022, in U.S. Appl. No. 17/195,202.
United States Patent and Trademark Office, Office Action dated Apr. 5, 2023, in U.S. Appl. No. 17/242,465.
United States Patent and Trademark Office, Office Action dated Jul. 5, 2023, in U.S. Appl. No. 17/863,837.
United States Patent and Trademark Office, Office Action dated Jul. 5, 2023, in U.S. Appl. No. 17/863,881.
United States Patent and Trademark Office, Office Action dated Jun. 8, 2023, in U.S. Appl. No. 18/127,343.
United States Patent and Trademark Office, Notice of Allowance mailed Aug. 22, 2023, in U.S. Appl. No. 17/242,465.
United States Patent and Trademark Office, Office Action mailed Oct. 17, 2023, in U.S. Appl. No. 17/863,837.
United States Patent and Trademark Office, Office Action mailed Oct. 24, 2023, in U.S. Appl. No. 17/863,881.
United States Patent and Trademark Office, Office Action mailed Sep. 20, 2023, in U.S. Appl. No. 18/127,343.
United States Patent and Trademark Office, Notice of Allowance mailed Dec. 13, 2023, in U.S. Appl. No. 18/127,343.
United States Patent and Trademark Office, Office Action mailed Nov. 15, 2023, in U.S. Appl. No. 18/131,982.

\* cited by examiner

● Home

New recording or upload ▼

New conversations

MetaLab: Weekly Design Review

 Home

 All Conversations

Wireframe Review - Statusing Session

Groups                    ⊕
• User Research

ACR - Swift Engineering discussions

• Design Team
• Marketing
• Partnership

Recent groups activites

Metalab

● Google I/O - Designer and engineers...

● Product User Testing n°5

[#] Labels                ⊕

User Research

○ Research Planification Meeting

Did you know Otter can

 Sync your calendar and record your meeting automatic

 Share meetings automatically with your attendees?

 Show you the live transcript when you're on your WIFI

FIG. 5

 Home                    Search conversations...         

New conversations                        View all conversations

MetaLab: Weekly Design Review

Wireframe Review - Statusing Session

ACR - Swift Engineering discussions                    

Recent groups activites                        View all groups

Metalab

 Google I/O - Designer and engineers...        Shared by Miriam T.

 Product User Testing n°5                      Shared by Margarat G.

User Research

 Research Planification Meeting                Shared by Alison G.

Did you know Otter can                    View more tips

 Sync your calendar and record your meeting automatically?    See how

 Share meetings automatically with your attendees?            See how

 Show you the live transcript when you're on your WIFI        See how

FIG. 6

< Back    Product User Testing with Margaret    Search transcript    Share and flow of narration and [Changes saved] natural in your writing As with anything, practice makes perfect. Not even the best writers get it right the first time. Start off writing in your dialogue diary and once you get to a first draft, it will be a matter of molding your words into the feel and message that you intend.

 Unknown Speaker
To write dialogue that is effectuate, you must also pay attention to formatting and style. Correct use of tags, punctuation, and paragraphs can be as important as the words themselves when writing dialogue.

 Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Steve Smith
Word choice tells a reader a lot about a person: appearance, ethnicity, background, and morality. It also can tell the reader how the writer feels about his or her characters.

00:35/36:00

FIG. 7

Product User Testing with Margaret

Search transcript and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Unknown Speaker
To write dialogue that is effectuate, you must also pay attention to formatting and style. Correct use of tags, punctuation, and paragraphs can be as important as the words themselves when writing dialogue.

Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Steve Smith
Word choice tells a reader a lot about a person: appearance, ethnicity, background, and morality. It also can tell the reader how the writer feels about his or her characters.

< Back    Product User Testing with Margaret    Search transcript    Share ⋮

As with anything, practice makes perfect. Not even the best writers get it right the first time. Start off writing in your dialogue diary and once you get to a first draft, it will be a matter of molding your words into the feel and message that you intend.

Unknown speaker
To write dialogue that is effectuate, you must also pay attention to formatting and style. Correct use of tags, punctuation, and paragraphs can be as important as the words themselves when writing dialogue.

🚫 This snippet is hidden. Others can't see or...

Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Steve Smith
Word choice tells a reader a lot about a person: appearance, ethnicity, background, and morality. It also can tell the reader how the writer feels about his or her characters.

< Back

Product User Testing with Margaret        Search transcript        Share

As with anything, practice makes perfect. Not even the best writers get it right the first time. Start off writing in your dialogue diary and once you get to a first draft, it will be a matter of molding your words into the feel and message that you intend.

Unknown speaker
To write dialogue that is effectuate, you must also pay attention to formatting and style. Correct use of tags, punctuation, and paragraphs can be as important as the words themselves when writing dialogue.

 This snippet is hidden. Others can't see or listen to that part of the conversation
Undo

Yourself
~~Reading will hone your creative abilities. It will help familiarize you with the form and flow of narration and dialogue until it becomes more natural in your writing.~~

~~As with anything, practice makes perfect. Not even the best writers get it right the first time. Start off writing in your dialogue diary and once you get to a first draft, it will be a matter of molding your words into the feel and message that you intend.~~

Steve Smith
Word choice tells a reader a lot about a person: appearance, ethnicity, background, and morality. It also can tell the reader how the writer feels about his or her characters.

< Back to Product Team

Search transcript

Product Team

Product User Testing with Margaret

📅 Dec. 13th · 10AM  · 🔴 39:45mins  · Margaret & Yourself  · Research ⊕

● Margaret Grey
Indirect dialogue doesn't rely on speech. Instead, it uses thoughts, memories, or recollections of past conversations to reveal important narrative details.

● Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Margaret Grey
To write dialogue that is effectuate, you must also pay attention to formatting and style. Correct use of tags, punctuation, and paragraphs can be as important as the

< Back to Product Team

Search transcript

Product User Testing with Margaret

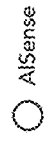
Product Team

📅 Dec. 13th · 10AM · ● 39:45mins · Margaret & Yourself · [ Add a label + ]

○ AlSense

○ Metalab

○ Remote design

○ Research

● Margaret Grey
Indirect dialogue doesn't rely on speech. Instes recollections of past conversations to reveal in ● Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Margaret Grey
To write dialogue that is effectuate, you must also pay attention to formatting and style. Correct use of tags, punctuation, and paragraphs can be as important as the

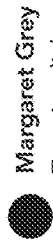 00:00/36:00

FIG. 15

Cancel | Choose snippets to merge into this one | Merge snippets

As with anything, practice makes perfect. Not even the best writers get it right the first time. Start off writing in your dialogue diary and once you get to a first draft, it will be a matter of molding your words into the feel and message that you intend.

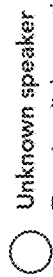 Unknown speaker
To write dialogue that is effectuate, you must also pay attention to formatting and style. Correct use of tags, punctuation, and paragraphs can be as important as the words themselves when writing dialogue.

 Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

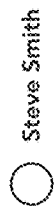 Steve Smith
Word choice tells a reader a lot about a person: appearance, ethnicity, background, and morality. It can also tell the reader how the writer feels abut his or her characters.

Sometimes saying nothing or saying the opposite of what we know a character feels is the best way to create dramatic tension. If a character wants to say "I love you," but his actions or words say, "I don't care," the reader will cringe at the missed opportunity.

FIG. 16

Cancel — Choose snippets to merge into this one — Merge snippets

As with anything, practice makes perfect. Not even the best writers get it right the first time. Start off writing in your dialogue diary and once you get to a first draft, it will be a matter of molding your words into the feel and message that you intend.

○ Unknown speaker
To write dialogue that is effectuate, you must also pay attention to formatting and style. Correct use of tags, punctuation, and paragraphs can be as important as the words themselves when writing dialogue.

● Unknown speaker
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Steve Smith
Word choice tells a reader a lot about a person: appearance, ethnicity, background, and morality. It can also tell the reader how the writer feels abut his or her characters.

Sometimes saying nothing or saying the opposite of what we know a character feels is the best way to create dramatic tension. If a character wants to say "I love you," but his actions or words say, "I don't care," the reader will cringe at the missed opportunity.

FIG. 17

< Back  Product User Testing with Margaret  Search transcript  

As with anything, practice makes perfect. Not even the best writers get it right the first time. Start off writing in your dialogue diary and once you get to a first draft, it will be a matter of molding your words into the feel and message that you intend.

 Unknown speaker
To write dialogue that is effectuate, you must also pay attention to formatting and style. Correct use of tags, punctuation, and paragraphs can be as important as the words themselves when writing dialogue.

 ⋯   Merge with other snippet(s)   Delete snippet

Yourself
Reading will hone your creative abilities. It will help familiar and flow of narration and dialogue until it becomes more As with anything, practice makes perfect. Not even the best writers get it right the first time. Start off writing in your dialogue diary and once you get to a first draft, it will be a matter of molding your words into the feel and message that you intend.

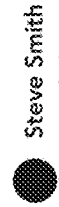 Steve Smith
Word choice tells a reader a lot about a person: appearance, ethnicity, background, and morality. It also can tell the reader how the writer feels about his or her characters.

   00:35/36:00

FIG. 18

< Back  Product User Testing with Margaret    Search conversations...    ⋮ Share

Unknown speaker
As with anything, practice makes perfect. Not even the best writers get it right the first time. Start off writing in your dialogue diary and once you get to a first draft, it will be a matter of molding your words into the feel and message that you intend.

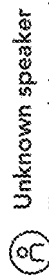

To write dialogue that is effectuate, you must also pay attention to formatting and style. Correct use of tags, punctuation, and paragraphs can be as important as the words themselves when writing dialogue.

  Merge with other snippet(s)
Delete snippet

Yourself
Reading will hone your creative abilities. It will help familiar and flow of narration and dialogue until it becomes more As with anything, practice makes perfect. Not even the best writers get it right the first time. Start off writing in your dialogue diary and once you get to a first draft, it will be a matter of molding your words into the feel and message that you intend.

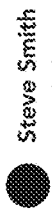

Steve Smith
Word choice tells a reader a lot about a person: appearance, ethnicity, background, and morality. It also can tell the reader how the writer feels about his or her characters.

  00:35/36:00

FIG. 19

< Back     Search transcript     

Product User Testing with Margaret

As with anything, practice ma[Snippets merged]est writers get it right the first time. Start off writing in your dialogue diary and once you get to a first draft, it will be a matter of molding your words into the feel and message that you intend.

 Unknown speaker

To write dialogue that is effectuate, you must also pay attention to formatting and style. Correct use of tags, punctuation, and paragraphs can be as important as the words themselves when writing dialogue.

● Yourself

Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Word choice tells a reader a lot about a person: appearance, ethnicity, background, and morality. It also can tell the reader how the writer feels about his or her characters.

Sometimes saying nothing or saying the opposite of what we know a character feels is the best way to create dramatic tension. If a character wants to say "I love you,"

      00:35/36:00

FIG. 20

Oll::

⌂ Home

▤ All Conversations

⇄ Groups
- User Research
- Design Team
- Marketing
- Partnership

View all

Labels

⟨ Back to Product Team

Search conversations...

Share

Product Team

Product User Testing with Margaret

▦ Dec. 13th · 10AM · ● 39:45mins · Margaret & Yourself · Add a label +

● Margaret Grey
Indirect dialogue doesn't rely on speech. Instead, it uses thoughts, memories, or recollections of past conversations to reveal important narrative details.

● Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Margaret Grey
To write dialogue that is effectuate, you must also pay attention to formatting and style. Correct use of tags, punctuation, and paragraphs can be as important as the

< Back     Product User Testing with Margaret     Search transcript     

and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

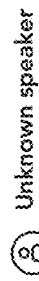 Unknown speaker
To write dialogue that is effectuate, you must also pay attention to formatting and style. Correct use of tags, punctuation, and paragraphs can be as important as the words themselves when writing dialogue.

 Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

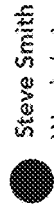 Steve Smith
Word choice tells a reader a lot about a person: appearance, ethnicity, background, and morality. It also can tell the reader how the writer feels about his or her characters.

00:35/36:00

FIG. 22

Cancel  ◉ Share only selected text  ○ Share whole conversations but jump to selection  Share As with anything, practice makes perfect. Not even the best writers get it right the first time. Start off writing in your dialogue diary and once you get to a first draft, it will be a matter of molding your words into the feel and message that you intend.

○ Unknown speaker
To write dialogue that is effectuate, you must also pay attention to formatting and style. Correct use of tags, punctuation, and paragraphs can be as important as the words themselves when writing dialogue.

⦿ Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

○ Steve Smith
Word choice tells a reader a lot about a person: appearance, ethnicity, background, and morality. It can also tell the reader how the writer feels abut his or her characters.

Sometimes saying nothing or saying the opposite of what we know a character feels is the best way to create dramatic tension. If a character wants to say "I love you," but his actions or words say, "I don't care," the reader will cringe at the missed opportunity.

○ Yourself

FIG. 23

FIG. 24

< Back

Product User Testing with Margaret     Search conversations...

...st writers get it right the first time. Start off writing in your dialogue diary and once you get to a first draft, it will be a matter of molding your words into the feel and message that you intend.

As with anything, practice mak Snipped shared

Unknown Speaker
To write dialogue that is effectuate, you must also pay attention to formatting and style. Correct use of tags, punctuation, and paragraphs can be as important as the words themselves when writing dialogue.

Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Steve Smith
Word choice tells a reader a lot about a person: appearance, ethnicity, background, and morality. It also can tell the reader how the writer feels about his or her characters.

00:35/36:00

FIG. 28

< Back

Product User Testing with Margaret

Search conversations...

Share

As with anything, practice makes perfect. Not even the best writers get it right the first time. Start off writing in your dialogue diary and once you get to a first draft, it will be a matter of molding your words into the feel and message that you intend.

Unknown Speaker
To write dialogue that is effectuate, you must also pay attention to formatting style. Correct use of tags, punctuation, and paragraphs can be as important as words themselves when writing dialogue.

Margaret Gray
Andy Reynolds
Samuel Medvedowski...
SHARED

Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Steve Smith
Word choice tells a reader a lot about a person: appearance, ethnicity, background, and morality. It also can tell the reader how the writer feels about his or her characters.

< Back    Product User Testing with Margaret    Search transcript    Share and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

Unknown Speaker

Miriam Thomas — e that is effectuate, you must also pay attention to formatting and
Margaret Grey — e of tags, punctuation, and paragraphs can be as important as the
 is when writing dialogue.

Andy Reynolds — e your creative abilities. It will help familiarize you with the form
tion and dialogue until it becomes more natural in your writing.

Will Carter — , practice makes perfect. Not even the best writers get it right the
ff writing in your dialogue diary and once you get to a first draft, it
will be a matter of molding your words into the feel and message that you intend.

Tag

Will Carter
Word choice tells a reader a lot about a person: appearance, ethnicity, background, and morality. It also can tell the reader how the writer feels about his or her characters.

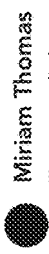
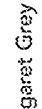
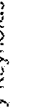
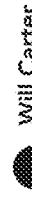
FIG. 33

Home

Search conversations...

Start recording

Upload an audio file

Contact & Calendar

Sync your calendar
Import your contacts

MetaLab: Weekly Design Review

Wireframe Review - Statusing Session

ACR - Swift Engineering discussions

Recent groups activites

View all groups

Metalab

● Google I/O - Designer and engineers... — Shared by Miriam T.

● Product User Testing n°5 — Shared by Margaret G.

User Research

● Research Planificaton Meeting — Shared by Alison G.

Did you know Otter can

View more tips

FIG. 37

Home

Search conversations...

Meghan hawes

View all conversatio: Account settings

Contact & Calendar sync

Logout from Otter

🏠 Home

☰ All Conversations

👥 Groups
- User Research
- Design Team
- Marketing
- Partnership

View all

Labels

New conversations

MetaLab: Weekly Design Review

Wireframe Review - Statusing Session

ACR - Swift Engineering discussions

Recent groups activites

Metalab

● Google I/O - Designer and engineers...    View all groups

○ Product User Testing n°5    Shared by Miriam T.

User Research    Shared by Margaret G.

○ Research Planificaton Meeting    Shared by Alison G.

FIG. 38

Home

Search conversations...

Start recording

- Home
- All Conversations
- Groups
  - User Research
  - Design Team
  - Marketing
  - Partnership
- Labels

New conversations

MetaLab: Weekly Design Review

Wireframe Review - Statusing Session

ACR - Swift Engineering discussions

Recent groups activities

Metalab

● Google I/O - Designer and engineers...

● Product User Testing n°5

User Research

○ Research Planification Meeting

Did you know Otter can

- Upload an audio file
- Contact & Calendar
- Sync your calendar
- Import your contacts
- Sync your calendar and record your meeting automatically?
- Share meetings automatically with your attendees?
- Show you the live transcript when you're on your WIFI

FIG. 39

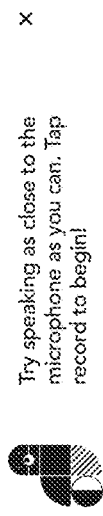
FIG. 51

Skip this step

← BACK

Welcome Sam.
Let's get started

Help us create a better, more unique Otter experience for you by completing these steps!

① Help Otter learn your voice

② Try some longer text

③ Contact & Calendar sync

Help Otter learn your unique voice!

Try saying: 'Hi Otter, my name is Andy'

● Samuel Medvedowsky
Hello Otter, my name is Samuel M

← BACK

Welcome Sam.
Let's get started

Help us create a better, more unique Otter experience for you by completing these steps!

1 Help Otter learn your voice

2 Try some longer text

3 Contact & Calendar sync

Skip this step

Now let's try a longer sentence

Try this: "Whether the weather is cold, or whether the weather is hot, we'll be together whatever the weather, whether we like it or not."

× With longer spoken text, Otter is more effective at learning your unique voice!

Product User Testing with Margaret

Search transcript

Eavesdrop. Carry a small notebook with you and write down phrases, words or whole conversations verbatim to help develop your inner ear.

Read. Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend. Remember that punctuation goes inside quotations. This keeps the dialogue clear and separate from the rest of the narrative. For example: "I can't believe you just did that!"

Start a new paragraph each time the speaker changes.

If there is action involved with a speaking character, keep the description of the action within the same paragraph as the dialogue of the character saying it.

Dialogue tags are best used sparingly, if at all. Tags are words used to convey the emotion within an action. For example: "But I don't want to go to sleep yet," he whined.

< Back

FIG. 57

FIG. 60

FIG. 61

< Minimize

Search transcript

Share

Add to group

Product User Testing with Margaret

Dec. 13th · 10AM · Margaret & Yourself · Add a label +

● Margaret Grey
Indirect dialogue doesn't rely on speech. Instead, it uses thoughts, memories, or recollections of past conversations to reveal important narrative details.

● Andy Reynolds
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Kim Smith
To write dialogue that is effective, you must also pay attention to formatting and style. Correct use of tags, punctuation, and paragraphs can be as important as the words themselves when writing dialogue

00:00:43

FIG. 62

< Minimize    Product User Testing with Margaret    Search transcript

...

recollections of past conversations to reveal important narrative details.

● Andy Reynolds
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Kim Smith
To write dialogue that is effective, you must also pay attention to formatting and style. Correct use of tags, punctuation, and paragraphs can be as important as the words themselves when writing dialogue.

Remember that punctuation goes inside quotations. This keeps the dialogue clear and separate from the rest of the narrative. For example: "I can't believe you just did that!"

Start a new paragraph each time the speaker changes.

If there is action involved with a speaking character, keep the description of the action within the same paragraph as the dialogue of the character saying it.

00:01:03

< Back

Product User Testing with ...          Dialogue          ✕    1/8 results ⌄    Share    ⋮

As with anything, practice makes perfect. Not even the best writers get it right the first time. Start off writing in your dialogue diary and once you get to a first draft, it will be a matter of molding your words into the feel and message that you intend.

🎤 Unknown speaker
To write dialogue that is effectuate, you must also pay attention to formatting and style. Correct use of tags, punctuation, and paragraphs can be as important as the words themselves when writing dialogue.

● Yourself
Reading will hone your creative abilities. It will help familiarize you with the form and flow of narration and dialogue until it becomes more natural in your writing.

As with anything, practice makes perfect. Not even the best writers get it right the first time. Start off writing in your dialogue diary and once you get to a first draft, it will be a matter of molding your words into the feel and message that you intend.

● Steve Smith
Word choice tells a reader a lot about a person: appearance, ethnicity, background, and morality. It also can tell the reader how the writer feels about his or her characters.

FIG. 75

FIG. 76

< Back to Product Team

Product Team

Product User Testing with Ma|

📅 Dec. 13th · 10AM  ·  🔴 39:45mins  ·  Margaret & Yourse

Margaret Grey
Indirect dialogue doesn't rely on speech. Instead, recollections of past conversations to reveal impo

Yourself
Reading will hone your creative abilities. It will hel and flow of narration and dialogue until it becom As with anything, practice makes perfect. Not eve first time. Start off writing in your dialogue diary and once you get to a first draft, it will be a matter of molding your words into the feel and message that you intend.

Margaret Grey
To write dialogue that is effectuate, you must also pay attention to formatting and style. Correct use of tags, punctuation, and paragraphs can be as important as the Search transcript Send to:

🔗 Anyone with the link     Can edit ∨

G  Import your Google contacts
    to add collaborators easily

∷ Access your contact book
    and add freinds easily

Share

⋯

Settings  ·  Copy link

< Back to Product Team

Product Team

Product User Testing with Ma|

Dec. 13th · 10AM  ·  39:45mins  ·  Margaret & Yourse

Search transcript

Send to: |

Permissions                                    Can edit ˅

Hi there, the recording of AiSense <> Metalab: Weekly Design Meeting is available. Log in to access the audio and transcript.

Cancel    Share

Margaret Grey
Indirect dialogue doesn't rely on speech. Instead, recollections of past conversations to reveal impo

Yourself
Reading will hone your creative abilities. It will hel and flow of narration and dialogue until it become As with anything, practice makes perfect. Not eve first time. Start off writing in your dialogue diary and once you get to a first draft, it will be a matter of molding your words into the feel and message that you intend.

Margaret Grey
To write dialogue that is effectuate, you must also pay attention to formatting and style. Correct use of tags, punctuation, and paragraphs can be as important as the

FIG. 80 iPod 📶     4:37PM     🔋⚡

Dashboard 🔍

Sync your Google calendar & contacts

Get reminded to record upcoming meetings. Easily share recordings with your contacts!

Connect your Google account

Remind me later

CONVERSATIONS

New Conversations

Fri, 2/2 · 4:03 PM
Brainstorm session

FIG. 81

 iPod   4:37PM   
Conversations
Fri, 2/2 · 4:03 PM
Brainstorm session
🕐 2:27
Fri, 2/2 · 3:44 PM
Weekly Team Meeting
🕐 0:27
Wed, 1/31 · 10:58 AM
Jevon
🕐 29:09
Thu, 1/25 · 3:17 PM
Niren visits AISense 
🕐 58:06    Shared by Sam
            
FIG. 82

 
Conversations
🔍 Search conversations
Fri, 2/2 · 4:37 PM
Brainstorm session
🕐 0:26
Fri, 2/2 · 3:44 PM
Weekly Team Meeting
🕐 0:27
Wed, 1/31 · 10:58 AM
Jevon
🕐 29:09
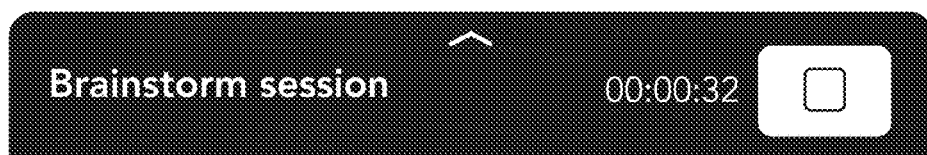
    
FIG. 83

 
Groups
@bizdev
0 conversations
@product
0 conversations
@technical
0 conversations
@general
0 conversations
    
FIG. 84

 
4:40PM
Weekly Design Syncs
Tue, 12/19 · 11:35 AM    1:05:46
ATTENDEES
Sam Liang, Simon Lau, Monica Buck...
 Sam Liang 0:19
So us on vacation, the sweep Sam is is another meeting feel john awesome morning
 Simon Lau 0:37
be looking at anything
     0:00/1:05:46
FIG. 85 iPod 　　　　4:41PM　　　　
🔍 Conversations　　　　　　　　　Cancel
100 Results
Tue, 1/23 · 3:23 PM　　　　　　　6 INSTANCES
Sam-Simon Weekly 1:1
🕐 35:24
it has this for the when you're
reviewing the conversation, not the r...
Fri, 7/14 · 3:15 PM　　　　　　　13 INSTANCES
Product Meeting
🕐 1:07:53
 point entry points that they can get to
the conversation should be should hi...
Thu, 5/25 · 2:31 PM　　　　　　　10 INSTANCES
Product Delivery Program Meeting
🕐 46:51
FIG. 86

🔍 bitcoin ✕

Tue, 10/31 · 1:55 PM
Meeting with Tim
🕐 44:04

... in teen was talking about bitcoin and here. Another thing is the search for example you place surf have been calling...

Sun, 11/19 · 4:06 PM
Bitcoin
🕐 20:53

...well. One K you have Bitcoin whatsoever. I don't know. So you just put in there, right? ...

...I'm talking about bitcoin, you know, that kind of thing collection....

Fri, 12/15 · 12:28 PM
Monthly business updates
🕐 1:30:49

...why is Bitcoin value so much because...

...I don't know bitcoins....

FIG. 87

63%    4:36 PM
Conversations 
Wed, 12/20 · 11:20 AM
Weekly Team Meeting
⏱ 1:48:33
Tue, 12/19 · 3:11 PM
1-on-1 with Sam
⏱ 51:24
Tue, 12/19 · 2:31 PM
Webinar on Blockchain
⏱ 30:32
Mon, 12/18 · 12:12 PM
Phone interview with Jan
⏱ 34:18
Fri, 12/15 · 2:11 PM
Lecture on Material Design
⏱ 1:15:46
Fri, 12/15 · 12:28 PM
Monthy business updates
Brainstorm ideas    00:28    
   
FIG. 88

  
Broker 7:42
401K, you have Bitcoin, whatsoever. I don't know. So you just put in there, right?
Broker 7:48
401K, life insurance is okay because already you have assigned beneficiaries.
Broker 7:57
I'm talking about bitcoin, you know, that kind of thing. Collections.
Broker 8:00
You know, that kind of thing.
Simon 8:08
So in the future, if I want to add things, I just put it here?
Broker 8:12
Right  this way, okay?
          7:43/20:53
FIG. 89

56% 5:07 PM
Dashboard 
CONVERSATIONS 
New Conversations
Thu, 2/15 · 5:05 PM
Daily sync-up 
🕐 1:56
Thu, 2/15 · 4:35 PM
Brainstorm ideas 
🕐 0:34
GROUPS 
Recent groups activites
Product Team
 Brilliant idea
Shared by Simon Lau
    
FIG. 90

Teach Otter to recognize your voice!
Tap RECORD to begin.
Say "Hi Otter, my name is S L. I *am your occupation*"
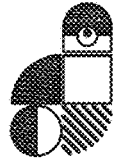 Tip: Speak close to the microphone, with no background noise.
Skip this step
FIG. 91

Now let's try a longer paragraph

Say "I'm excited to give this app a try. I haven't found anything that can do what Otter does and do it really well.

I plan to use it whenever I want to record my conversations, and let Otter transcribe and organize them for me, so I can easily search and share my conversations as needed.

I understand that Otter may not recognize every word perfectly, especially if the audio quality is poor or the speech is soft-spoken

Tip: Speak close to the microphone, with no background noise.

Skip this step

FIG. 92

55%  5:09 PM
Groups 
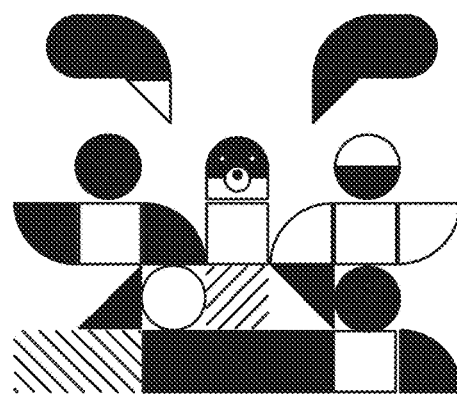
Create your first group
Groups allows you to organize and share your conversations with your team and friends.
    
FIG. 93

3:46
Conversations
🔍 Search conversations
Fri, 2/2 · 3:44 PM
Weekly Team Meeting
🕐 0:27
Wed, 1/31 · 10:58 AM
Jevon
🕐 29:09
Thu, 1/25 · 3:17 PM
Niren visits AISense
🕐 58:06 · 👥 Shared by Sam          (S)
Wed, 1/24 · 11:05 AM
Call with Donald Tucker (Cisco)
🕐 42:09 · 👥 Shared by Sam          (S)
Tue, 1/23 · 3:23 PM
Sam-Simon Weekly 1:1
🕐 35:24
Fri, 1/19 · 1:30 PM
Note
  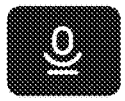  
FIG. 95

3:59 
Groups
@bizdev
0 conversations 
@product
0 conversations 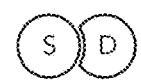
@technical
0 conversations 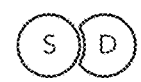
@general
0 conversations 
    
FIG. 96

Weekly Design Syncs
Tue, 12/19 · 11:35 AM    1:05:46
ATTENDEES
Sam Liang, Simon Lau, Monica Buck, Andre...
Sam Liang  0:19
So us on vacation, the sweep Sam is is another meeting feel john awesome morning
Simon Lau  0:37
be looking at anything
Sam Liang  0:39
that we're sharing today who are
Samuel Medvedowsky  0:42
going to be looking at it in the
Simon Lau  0:46
meeting in and see if we can get started
      0:00/1:05:46
FIG. 97

4:03 
Brainstorm session
00:00:52
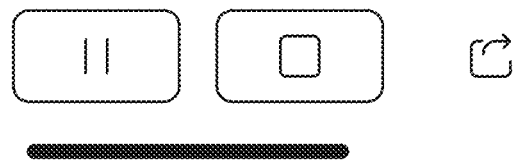
FIG. 98

Conversations
🔍 Search conversations
Fri, 2/2 · 4:03 PM
Brainstorm session
● 1:59 
Fri, 2/2 · 3:44 PM
Weekly Team Meeting
● 0:27
Wed, 1/31 · 10:58 AM
Jevon
● 29:09
FIG. 99
Thu, 1/25 · 3:17 PM
Niren visits AISense
● 58:06 · 👥 Shared by Sam 
Wed, 1/24 · 11:05 AM
Call with Donald Tucker (Cisco)
● 42:09 · 👥 Shared by Sam 
Brainstorm session    00:02:20   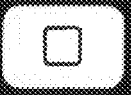
  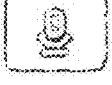  

4:05

< Teach Otter your voice

Tap RECORD to begin.

Say "Hi Otter, my name is Simon Lau. I'm excited to give this app a try. I haven't found anything that can do what Otter does and do it really well.

I plan to use it whenever I want to record my conversations, and let Otter transcribe and organize them for me, so I can easily search and share my conversation as needed.

I understand that Otter may not recognize every word perfectly, especially if the audio quality is poor or the speech is soft-spoken or unintelligible. But I know that Otter will improve over time. I can't wait to get started!"

FIG. 100

 Tip: Speak close to the microphone, with no background noise.

4:22

🔍 Conversations            ⊗  Cancel

100 Results

Fri, 3/10 · 11:44 AM                    6 INSTANCES
Matt-to-Simon Knowledge Transfer (6 of 6)
● 12:29 talk about the category and [conversation]
analytics seems to be the category

Tue, 11/14 · 12:20 PM                   5 INSTANCES
Design debrief
● 9:28

... part this one. The only way you do it is you
select a few Bible, create a new [conversatio...]

Tue, 4/4 · 3:05 PM                      19 INSTANCES
[1:1] Sam & Simon
● 50:53 but maybe we can just to help with the the
[conversational] is enterprises maybe we can Mon, 7/10 · 5:37 PM                     5 INSTANCES
Note
● 10:50

FIG. 101

SYSTEMS AND METHODS FOR PROCESSING AND PRESENTING CONVERSATIONS

1. CROSS-REFERENCES TO RELATED APPLICATIONS

This application is a continuation of U.S. patent application Ser. No. 16/276,446, filed Feb. 14, 2019, which claims priority to U.S. Provisional Patent Application No. 62/710,631, filed Feb. 16, 2018, U.S. Provisional Patent Application No. 62/631,680, filed Feb. 17, 2018, and U.S. Provisional Patent Application No. 62/668,623, filed May 8, 2018, all of these applications being incorporated by reference herein for all purposes. In addition, U.S. patent application Ser. No. 16/276,446 is a continuation-in-part of U.S. patent application Ser. No. 16/027,511, filed Jul. 5, 2018, claiming priority to U.S. Provisional Patent Application No. 62/530,227, filed Jul. 9, 2017, all of these applications being incorporated by reference herein for all purposes.

2. BACKGROUND OF THE INVENTION

Certain embodiments of the present invention are directed to signal processing. More particularly, some embodiments of the invention provide systems and methods for processing and presenting conversations. Merely by way of example, some embodiments of the invention have been applied to conversations captured in audio form. But it would be recognized that the invention has a much broader range of applicability.

Conversations, such as human-to-human conversations, include information that is often difficult to comprehensively, efficiently, and accurately extract, using conventional methods and systems. For example, conventional note-taking performed during a conversation not only distracts the note-taker from the conversation but can also lead to inaccurate recordation of information due to human-error, such as for human's inability to multitask well and process information efficiently with high accuracy in real time.

Hence it is highly desirable to provide systems and methods for processing and presenting conversations (e.g., in an automatic manner) to increase the value of conversations, such as human-to-human conversations, at least by increasing the comprehensiveness and accuracy of information extractable from the conversations.

3. BRIEF SUMMARY OF THE INVENTION

Certain embodiments of the present invention are directed to signal processing. More particularly, some embodiments of the invention provide systems and methods for processing and presenting conversations. Merely by way of example, some embodiments of the invention have been applied to conversations captured in audio form. But it would be recognized that the invention has a much broader range of applicability.

According to some embodiments, a system for processing and presenting a conversation includes a sensor, a processor, and a presenter. The sensor is configured to capture an audio-form conversation. The processor is configured to automatically transform the audio-form conversation into a transformed conversation. The transformed conversation includes a synchronized text, wherein the synchronized text is synchronized with the audio-form conversation. The presenter is configured to present the transformed conversation including the synchronized text and the audio-form conversation. The presenter is further configured to present the transformed conversation to be navigable, searchable, assignable, editable, and shareable.

According to some embodiments, a computer-implemented method for processing and presenting a conversation includes receiving an audio-form conversation; automatically transforming the audio-form conversation into a transformed conversation, the transformed conversation including a synchronized text, the synchronized text being synchronized with the audio-form conversation; and presenting the transformed conversation including the synchronized text and the audio-form conversation. The presenting the transformed conversation including the synchronized text and the audio-form conversation includes presenting the transformed conversation to be navigable, searchable, assignable, editable, and shareable.

According to some embodiments, a non-transitory computer-readable medium with instructions stored thereon, that when executed by a processor, perform the processes including: receiving an audio-form conversation; automatically transforming the audio-form conversation into a transformed conversation, the transformed conversation including a synchronized text, the synchronized text being synchronized with the audio-form conversation; and presenting the transformed conversation including the synchronized text and the audio-form conversation. The presenting the transformed conversation including the synchronized text and the audio-form conversation includes presenting the transformed conversation to be navigable, searchable, assignable, editable, and shareable.

According to various embodiments, a system for presenting a conversation includes a sensor configured to capture an audio-form conversation and send the captured audio-form conversation to a processor. The processor is configured to automatically transform the audio-form conversation into a transformed conversation. The transformed conversation includes a synchronized text. The synchronized text is synchronized with the audio-form conversation. The system further includes a presenter configured to receive the transformed conversation from the processor and present the transformed conversation including the synchronized text and the audio-form conversation. The presenter is further configured to present the transformed conversation to be navigable, searchable, assignable, editable, and shareable.

According to certain embodiments, a computer-implemented method for processing and presenting a conversation includes receiving an audio-form conversation; sending the received audio-form conversation to automatically transform the audio-form conversation into a transformed conversation, wherein the transformed conversation includes a synchronized text, that is synchronized with the audio-form conversation; receiving the transformed conversation; and presenting the transformed conversation including the synchronized text and the audio-form conversation, wherein the presenting the transformed conversation including the synchronized text and the audio-form conversation includes presenting the transformed conversation to be navigable, searchable, assignable, editable, and shareable.

According to certain examples, a non-transitory computer-readable medium with instructions stored thereon, that when executed by a processor, perform the processes including receiving an audio-form conversation; sending the received audio-form conversation to automatically transform the audio-form conversation into a transformed conversation, the transformed conversation including a synchronized text, the synchronized text being synchronized with the audio-form conversation; receiving the transformed conversation; and presenting the transformed conversation including the synchronized text and the audio-form conversation, wherein the presenting the transformed conversation including the synchronized text and the audio-form conversation includes presenting the transformed conversation to be navigable, searchable, assignable, editable, and shareable.

According to some examples, a system for transforming a conversation includes a processor configured to receive from a sensor a captured audio-form conversation; automatically transform the audio-form conversation into a transformed conversation, the transformed conversation including a synchronized text, the synchronized text being synchronized with the audio-form conversation; and send the transformed conversation to a presenter configured to present the transformed conversation including the synchronized text and the audio-form conversation, wherein the processor is further configured to send the transformed conversation to the presenter further configured to present the transformed conversation to be navigable, searchable, assignable, editable, and shareable.

According to certain examples, a computer-implemented method for transforming a conversation includes receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation, wherein the sending the transformed conversation to present the transformed conversation including the synchronized text and the audio-form conversation includes sending the transformed conversation to present the transformed conversation to be navigable, searchable, assignable, editable, and shareable.

According to various examples, a non-transitory computer-readable medium with instructions stored thereon, that when executed by a processor, perform the processes including receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation, wherein the sending the transformed conversation to present the transformed conversation including the synchronized text and the audio-form conversation includes sending the transformed conversation to present the transformed conversation to be navigable, searchable, assignable, editable, and shareable.

Depending upon embodiment, one or more benefits may be achieved. These benefits and various additional objects, features and advantages of the present invention can be fully appreciated with reference to the detailed description and accompanying drawings that follow.

4. BRIEF DESCRIPTION OF THE DRAWINGS

FIGS. 4-101 are simplified diagrams showing a user interface and/or a presenter related to FIG. 1, FIG. 2, FIG. 3, and/or FIG. 102, according to some embodiments of the present invention.

5. DETAILED DESCRIPTION OF THE INVENTION

Certain embodiments of the present invention are directed to signal processing. More particularly, some embodiments of the invention provide systems and methods for processing and presenting conversations. Merely by way of example, some embodiments of the invention have been applied to conversations captured in audio form. But it would be recognized that the invention has a much broader range of applicability.

Figure 1:
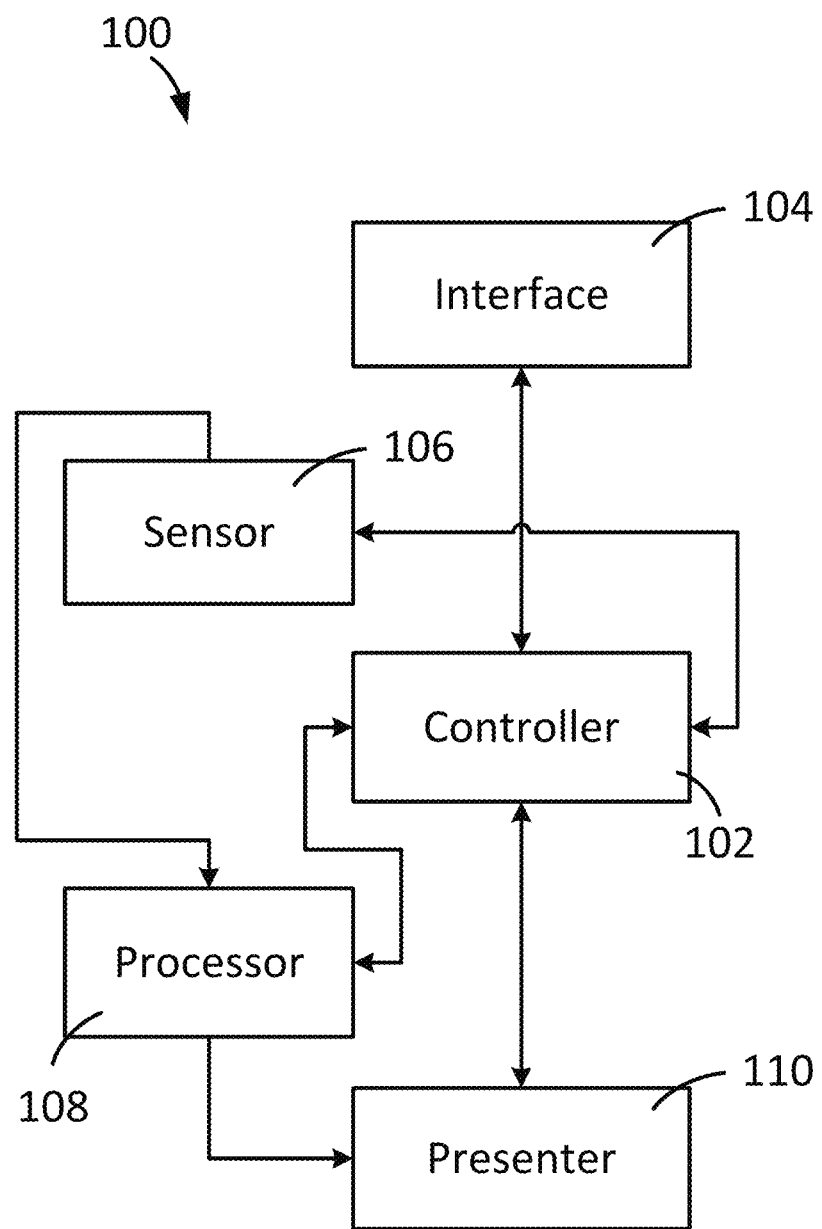
FIG. 1 is a simplified diagram showing a system for processing and presenting one or more conversations, according to some embodiments of the present invention.
Figure 2:
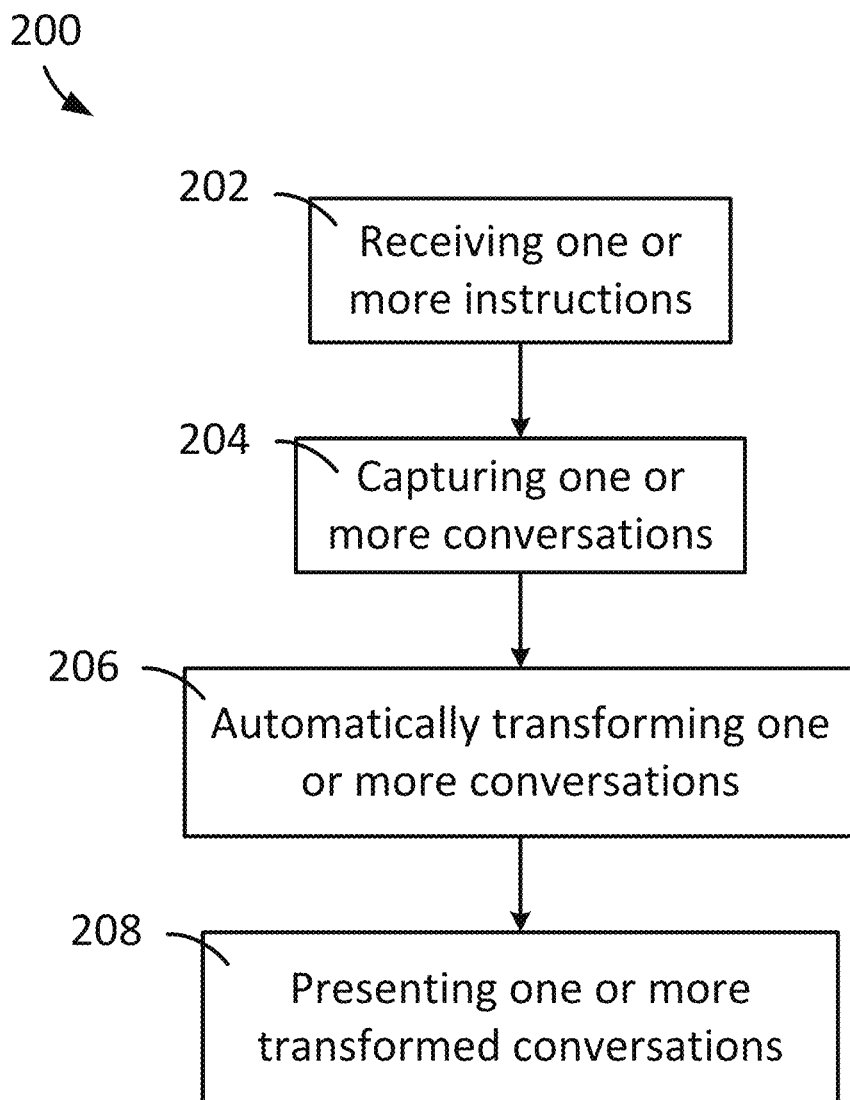
FIG. 2 is a simplified diagram showing a method for processing and presenting one or more conversations, according to some embodiments of the present invention.
Figure 3:
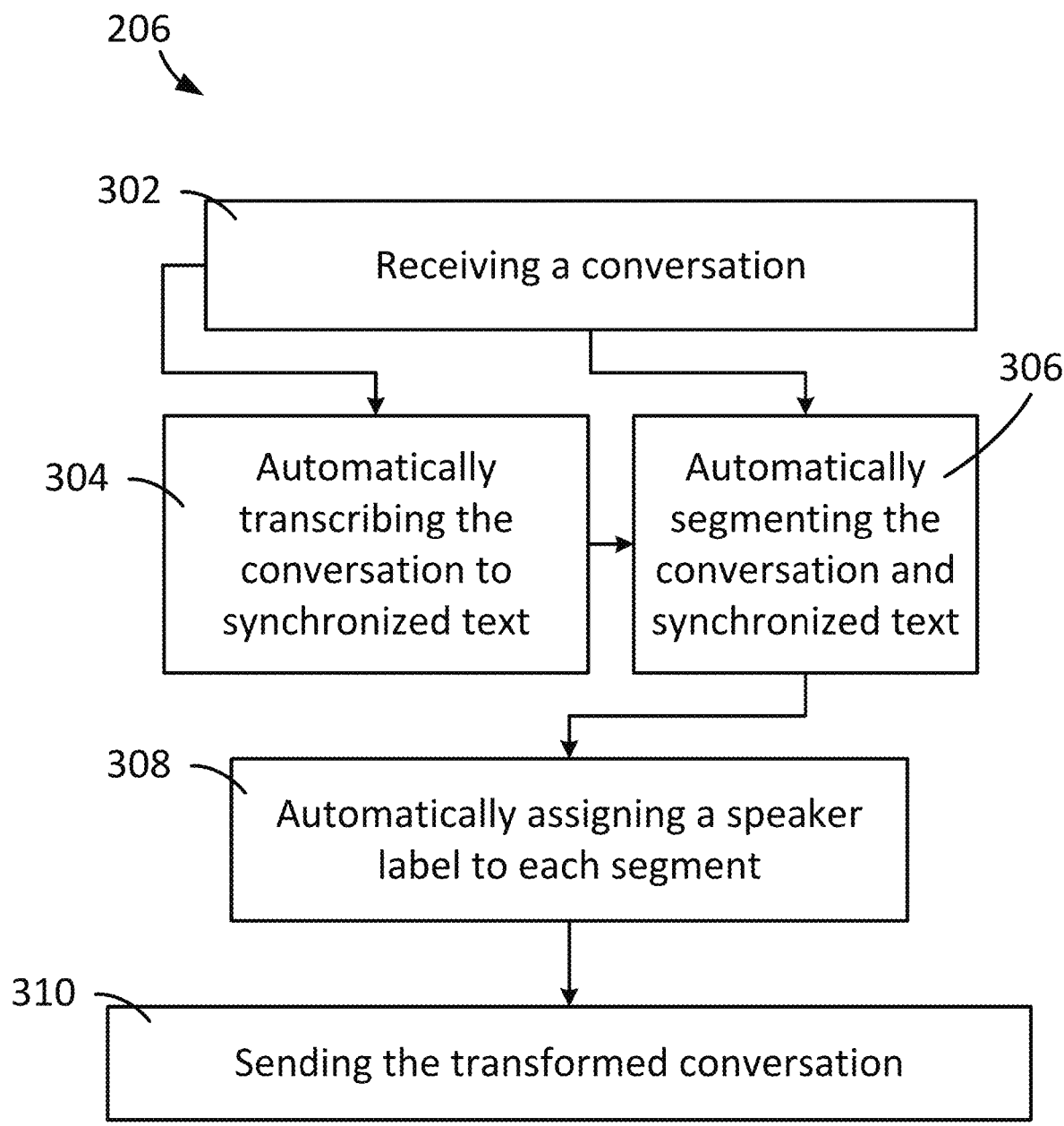
FIG. 3 is a simplified diagram showing a process for automatically transforming one or more conversations as shown in FIG. 2, according to some embodiments of the present invention.
Figure 4:
Figure 102:
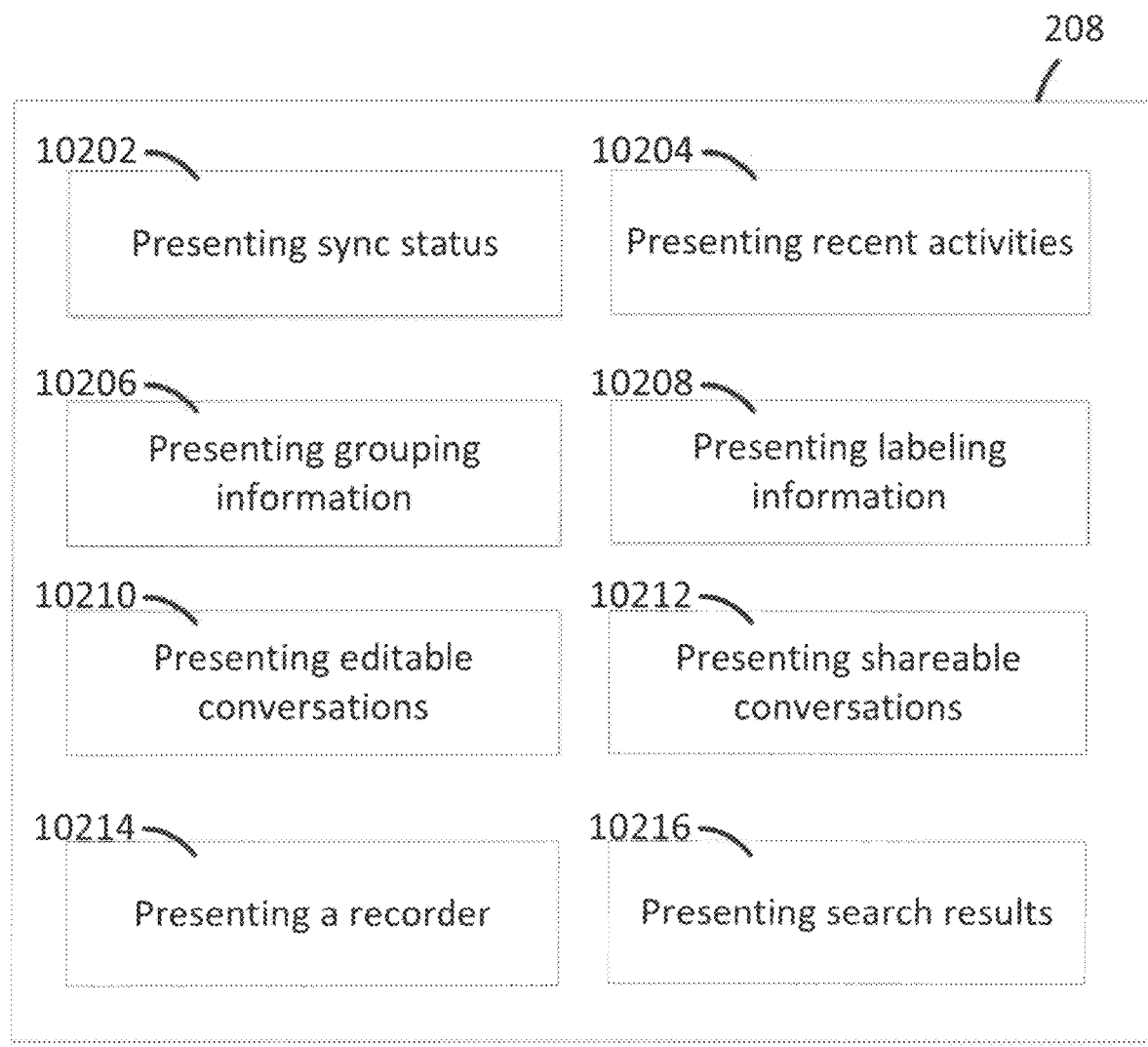
FIG. 102 is a simplified diagram showing a process for presenting one or more transformed conversations as shown in FIG. 2, according to some embodiments of the present invention.

FIG. 1 is a simplified diagram showing a system for processing and presenting one or more conversations, according to some embodiments of the present invention; FIG. 2 is a simplified diagram showing a method for processing and presenting one or more conversations, according to some embodiments of the present invention; FIG. 3 is a simplified diagram showing a process for automatically transforming one or more conversations as shown in FIG. 2, according to some embodiments of the present invention; FIGS. 4-101 are simplified diagrams showing a user interface and/or a presenter related to FIG. 1, FIG. 2, FIG. 3, and/or FIG. 102, according to some embodiments of the present invention; and FIG. 102 is a simplified diagram showing a process for presenting one or more transformed conversations as shown in FIG. 2, according to some embodiments of the present invention. These diagrams are merely examples, which should not unduly limit the scope of the claims. One of ordinary skill in the art would recognize many variations, alternatives, and modifications.

FIG. 1 is a simplified diagram showing a system 100 for processing and presenting one or more conversations according to some embodiments of the present invention. This diagram is merely an example, which should not unduly limit the scope of the claims. One of ordinary skill in the art would recognize many variations, alternatives, and modifications. The system 100 includes a controller 102, an interface 104, a sensor 106, a processor 108, and a presenter 110. In some examples, the presenter 110 includes a mobile device, a web browser, a computer, a watch, a phone, a tablet, a robot, a projector, a television, and/or a display. In certain examples, the presenter 110 includes part of a mobile device, part of a web browser, part of a computer, part of a watch, part of a phone, part of a tablet, part of a robot, part of a projector, part of a television, and/or part of a display. Although the above has been shown using a selected group of components for the system, there can be many alternatives, modifications, and variations. For example, some of the components may be expanded and/or combined. Other components may be inserted to those noted above. Depending upon the embodiment, the arrangement of components may be interchanged with others replaced. Further details of these components are found throughout the present specification.

In some embodiments, the controller 102 is configured to receive and/or send one or more instructions to other components of the system 100. For example, the controller 102 is configured to receive a first instruction from the interface 104 and send a second instruction to the sensor 106. In some examples, the controller 102 is or is part of a computing device (e.g., a computer, a phone, a laptop, a tablet, a watch, a television, a recording device, and/or a robot). In some embodiments, the controller includes hardware (e.g., a processor, a memory, a transmitter, a receiver, and/or software) for receiving, transmitting, and/or transforming instructions.

According to some embodiments, the interface 104 includes a user interface and/or is configured to receive a user instruction from a user of the system 100, and send a system instruction to one or more other components of the system 100 (e.g., the controller 102). For example, the interface includes a touchscreen, a button, a keyboard, a dialer (e.g., with number pad), an audio receiver, a gesture receiver, an application such as Otter for IOS or Android, and/or a webpage. In another example, the user is a human or another hardware and/or software system. In some embodiments, the interface 104 is configured to receive a first start instruction (e.g., when a user taps a start-record button in a mobile application) and to send a second start instruction to the controller 102 which in turn sends a third start instruction to, for example, the sensor 106. In some embodiments, the interface 104 is controlled by the controller 102 to provide one or more selectable actions (e.g., by the user). For example, the controller 102 controls the interface 104 to display a search bar and/or a record button for receiving instructions such as user instructions. In some embodiments, the interface 104 is communicatively coupled to the controller 102 and/or structurally contained or included in a common device (e.g., a phone).

In some embodiments, the sensor 106 is configured to receive an instruction and sense, receive, collect, detect, and/or capture a conversation in audio form (e.g., an audio file and/or an audio signal). For example, the sensor 106 includes an audio sensor and is configured to capture a conversation in audio form, such as to record a conversation (e.g., a human-to-human conversation). In some examples, the audio sensor is a microphone, which is included as part of a device (e.g., a mobile phone) and/or a separate component coupled to the device (e.g., the mobile phone), and the device (e.g., the mobile phone) includes one or more components of the system 100 (e.g., controller 102). In some examples, the human-to-human conversation captured by the sensor 106 is sent (e.g., transmitted) to other components of the system 100. For example, the audio-form conversation captured by the sensor 106 (e.g., the audio recorded by the sensor 106) is sent to the processor 108 of the system 100. In some embodiments, the sensor 106 is communicatively coupled to the controller such that the sensor is configured to send a status signal (e.g., a feedback signal) to the controller to indicate whether the sensor is on (e.g., recording or capturing) or off (e.g., not recording or not capturing).

According to some embodiments, the processor 108 is configured to receive input including data, signal, and/or information from other components of the system 100, and to process, transform, transcribe, extract, and/or summarize the received input (e.g., audio recording). In some examples, the processor 108 is further configured to send, transmit, and/or present the processed output (e.g., transformed conversation). For example, the processor 108 is configured to receive the captured audio-form conversation (e.g., the audio recorded by the sensor 106) from the sensor 106. As an example, the processor 108 is configured to receive the conversation in audio form (e.g., an audio file and/or an audio signal) from the sensor 106. In some examples, the processor 108 is configured to be controlled by the controller 102, such as to process the data, signal, and/or information transmitted by the sensor 106, when an instruction sent from the controller 102 is received by the processor 108. In some embodiments, the processor 108 includes an automated speech recognition system (ASR) that is configured to automatically transform and/or transcribe a conversation (e.g., a captured conversation sent from the sensor 106), such as transforming the conversation from audio recording to synchronized transcription.

In some embodiments, the processor 108 is communicatively coupled to the controller 102 such that the processor 108 is configured to send a status signal (e.g., a feedback signal) to the controller 102 to indicate whether the processor 108 is processing or idling and/or to indicate a progress of a processing job. In some examples, the processor 108 includes an on-board processor of a client device such as a mobile phone, a tablet, a watch, a wearable, a computer, a television, and/or a robot. In some examples, the processor 108 includes an external processor of a server device and/or an external processor of another client device, such that the capturing (e.g., by the sensor 106) and the processing (e.g., by the processor 108) of the system 100 are performed with more than one device. For example, a sensor 106 is a microphone on a mobile phone (e.g., located at a client position) and is configured to capture a phone conversation in audio form, which is transmitted (e.g., wirelessly) to a server computer (e.g., located at a server position). For example, the server computer (e.g., located at a server position) includes the processor 108 configured to process the input (e.g., an audio file and/or an audio signal) that is sent by the sensor 106 and received by the processor 108.

According to some embodiments, the processor 108 is configured to output processed data, signal, and/or information, to the presenter 110 (e.g., a display) of the system 100. In some examples, the output is a processed or transformed form of the input received by the processor 108 (e.g., an audio file and/or an audio signal sent by the sensor 106). For example, the processor 108 is configured to generate a transformed conversation and send the transformed conversation to the presenter 110 (e.g., a display) of the system 100. As an example, the processor 108 is configured to output synchronized text accompanied by a timestamped audio recording by transforming the conversation that is captured in audio form (e.g., captured by the sensor 106). In some embodiments, the processing and/or transforming performed by the processor 108 is real-time or near real-time. In some embodiments, the processor 108 is configured to process a live recording (e.g., a live recording of a human-to-human conversation) and/or a pre-recording (e.g., a pre-recording of a human-to-human conversation).

In some embodiments, the presenter 110 is configured to present, display, play, project, and/or recreate the conversation that is captured, for example, by the sensor 106, before and/or after transformation by the processor 108. For example, the presenter 110 (e.g., a display) is configured to receive the transformed conversation from the processor 108 and present the transformed conversation. As an example, the presenter 110 (e.g., a display) receives the captured conversation from the processor 108 before and/or after input (e.g., an audio file and/or an audio signal) to the processor 108 is transformed by the processor 108 into output (e.g., transformed conversation).

In some examples, the presenter 110 is or is part of a mobile device, a web browser, a computer, a watch, a phone, a tablet, a robot, a projector, a television, and/or a display. In some embodiments, the presenter 110 is provided similarly to the interface 104 by the same device. In some examples, a mobile phone is configured to provide both the interface 104 (e.g., touchscreen) and the presenter 110 (e.g., display). In certain examples, the interface 104 (e.g., touchscreen) of the mobile phone is configured to also function as the presenter 110 (e.g., display).

In certain embodiments, the presenter 110 includes a presenter interface configured for a user, analyzer, and/or recipient to interact with, edit, and/or manipulate the presented conversation. In some examples, the presenter 110 is communicatively coupled to the controller 102 such that the controller 102 provides instructions to the presenter 110, such as to switch the presenter 110 on (e.g., presenting a transformed conversation) and/or switch the presenter 110 off.

As discussed above and further emphasized here, FIG. 1 is merely an example, which should not unduly limit the scope of the claims. One of ordinary skill in the art would recognize many variations, alternatives, and modifications. In certain examples, the system 100 further includes other components and/or features in addition to the controller 102, the interface 104, the sensor 106, the processor 108, and/or the presenter 110. For example, the system 100 includes one or more sensors additional to sensor 106, such as a camera, an accelerometer, a temperature sensor, a proximity sensor, a barometer, a biometric sensor, a gyroscope, a magnetometer, a light sensor, and/or a positioning system (e.g. a GPS).

FIG. 2 is a simplified diagram showing a method 200 for processing and presenting one or more conversations according to some embodiments of the present invention. This diagram is merely an example, which should not unduly limit the scope of the claims. One of ordinary skill in the art would recognize many variations, alternatives, and modifications. The method 200 includes process 202 for receiving one or more instructions, process 204 for capturing one or more conversations, process 206 for automatically transforming one or more conversations, and process 208 for presenting one or more transformed conversations. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced.

In some examples, some or all processes (e.g., steps) of the method 200 are performed by the system 100. In certain examples, some or all processes (e.g., steps) of the method 200 are performed by a computer and/or a processor directed by a code. For example, a computer includes a server computer and/or a client computer (e.g., a smartphone). In some examples, some or all processes (e.g., steps) of the method 200 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

At the process 202, one or more instructions are received. In some examples, one or more instructions are provided by a user (e.g., a human, and/or a hardware and/or software system) and received by one or more components of the system 100 described above, such as received by the interface 104, the controller 102, the sensor 106, the processor 108, and/or the presenter 110. For example, the one or more instructions include a direct instruction (e.g., when the instruction is provided directly to a component) and/or an indirect instruction (e.g., when the instruction is provided to a gateway component which then instructs the component of interest to perform a process).

In certain examples, the one or more instructions cause the controller 102 to switch the sensor 106 between a capturing state and an idling state. For example, in the capturing state, the sensor 106 captures one or more conversations. In another example, in the idling state, the sensor 106 does not capture any conversation. In some examples, receiving a direct instruction includes a user directly switching on the sensor 106 to start the capturing of a conversation. In certain examples, receiving an indirect instruction includes receiving a start instruction via the interface 104, which then instructs the controller 102 to instruct the sensor 120 to start capturing a conversation.

At the process 204, one or more conversations (e.g., one or more human-to-human conversations) are captured. In some examples, one or more conversations (e.g., a meeting conversation and/or a phone conversation) are captured by live recording via the sensor 106 (e.g., a microphone, a phone, a receiver, and/or a computing device). In certain examples, one or more conversations are captured by loading (e.g., by wire and/or wirelessly) one or more conversations in audio form (e.g., a .mp3 file, a .wav file, and/or a .m4a file). In some embodiments, capturing one or more conversations include capturing an incoming and/or outgoing phone conversation. In some embodiments, capturing one or more conversations includes capturing minutes, notes, ideas, and/or action items (e.g., of a meeting). In some embodiments, capturing one or more conversations includes capturing metadata corresponding to the one or more conversations, and the metadata include date of capture, time of capture, duration of capture, and/or title of the capture (e.g., a title that is entered via the interface 104).

In some embodiments, capturing one or more conversations includes utilizing one or more components (e.g., the sensor 106, the controller 102, the processor 108, and/or the interface 104) of the system 100 and/or utilizing one or more components external to the system 100. In some examples, the sensor 106 of the system 100 is configured to capture a live conversation. In certain examples, the controller 102 and/or the processor 108 are configured to receive a pre-recorded conversation (e.g., a .mp3 file, a .wav file, and/or a .m4a file). In some examples, the interface 104 is configured to capture metadata associated to the conversation. In certain examples, a clock (e.g., of the system 100 or external to the system 100) is configured to provide date and time information associated with the conversation.

At the process 206, one or more conversations (e.g., the one or more conversations captured at the process 204) are transformed (e.g., transcribed, extracted, converted, summarized, and/or processed) automatically. In some examples, the captured conversations are transformed by the processor 108. In certain examples, the process 206 is implemented according to FIG. 3.

FIG. 3 is a simplified diagram showing the process 206 for automatically transforming one or more conversations, according to some embodiments of the present invention. This diagram is merely an example, which should not unduly limit the scope of the claims. One of ordinary skill in the art would recognize many variations, alternatives, and modifications. The process 206 includes process 302 for receiving a conversation, process 304 for automatically transcribing the conversation to synchronized text (e.g., synchronized transcript), process 306 for automatically segmenting the conversation in audio form and the synchronized text, process 308 for automatically assigning a speaker label to each conversation segment, and process 310 for sending the transformed conversation (e.g., including synchronized text with speaker-labeled conversation segments). Although the above has been shown using a selected group of processes for the process 206, there can be many alternatives, modifications, and variations. For example, some of the processes may be expanded and/or combined. Other processes may be inserted to those noted above. Depending upon the embodiment, the sequence of processes may be interchanged with others replaced.

In some examples, some or all processes (e.g., steps) of the process 206 are performed by the system 100. In certain examples, some or all processes (e.g., steps) of the process 206 are performed by a computer and/or a processor directed by a code. For example, a computer includes a server computer and/or a client computer (e.g., a smartphone). In some examples, some or all processes (e.g., steps) of the process 206 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

At the process 302, a conversation (e.g., a human-to-human conversation) is received. For example, a conversation is received by the system 100, such as by the processor 108. In some embodiments, the conversation (e.g., a human-to-human conversation) received in process 302 is in audio form (e.g., sound wave and/or digital signal) and is captured by and/or sent from the sensor 106 of the system 100. In some embodiments, the conversation received in process 302 is a live recording (e.g., a live recording of a human-to-human conversation). In some examples, the conversation is received (e.g., by the processor 108 of the system 100) continuously and/or intermittently (e.g., via fixed frequency push). In certain examples, the conversation is received (e.g., by the processor 108 of the system 100) in real-time and/or in near real-time (e.g., with a time delay less than 5 minutes, 1 minutes, or 4 seconds between capture and reception of a conversation).

In certain embodiments, the conversation (e.g., a human-to-human conversation) received in process 302 is a pre-recorded conversation in audio form (e.g., sound wave and/or digital signal). For example, the pre-recorded conversation is an audio recording (e.g., a .mp3 file, a .wav file, and/or a .m4a file) uploaded from an internal device and/or an external device (e.g., a local storage device such as a hard drive, and/or a remote storage device such as cloud storage). In some examples, the conversation received in process 302 is a phone conversation. In certain examples, the conversation is automatically received in process 302, such as by the processor 108, such as whenever a conversation is sent to the processor (e.g., from the sensor 106 and/or from the controller 102).

At the process 304, a conversation (e.g., an audio-form conversation received at process 302) is automatically transcribed into synchronized text. In some embodiments, the conversation is automatically transcribed (e.g., with no user input or with minimal user input). In some examples, the transcribing is performed by at least the processor 108 of the system 100. In certain examples, the transcribing is performed by the processor 108 and modifiable by a human. In some embodiments, the conversation transcribed at process 304 includes the conversation received at process 302, which is in audio form (e.g., sound wave and/or digital signal).

In some embodiments, the text (e.g., the transcript) generated at process 304 includes English words, phrases, and/or terms. In certain embodiments, the audio-form conversation received at process 302 and the text generated at process 304 are timestamped and/or indexed with time, to synchronize the audio and the text. For example, the audio-form conversation received at process 302 and the text (e.g., the transcript) generated at process 304 are synchronized. In some examples, the text (e.g., the transcript) generated at process 304 is searchable. For example, the text (e.g., the transcript) is searchable via a search bar as shown in FIG. 7O, which is discussed below. In certain examples, once transcribed at process 304, the conversation (e.g., from process 302) becomes a transcribed conversation including both audio and text that is synchronized with the audio.

At the process 306, a conversation in audio form (e.g., the conversation in audio form received at process 302) and a synchronized text (e.g., the synchronized text generated at process 304) are automatically segmented. In some embodiments, the audio-form conversation and the synchronized text are automatically segmented (e.g., with no user input or with minimal user input), and the segmented audio-form conversation and the segmented synchronized text are automatically generated. In some examples, the segmenting is performed by the processor 108 of the system 100. In certain examples, the segmenting is performed by the processor 108 and modifiable by a human. In certain embodiments, the conversation (e.g., audio-form conversation and/or the synchronized text) is segmented at process 304 into different segments when a speaker change occurs and/or a natural pause occurs. In some embodiments, each segment of the audio-form conversation and the synchronized text generated at process 306 is associated with one or more timestamps, each timestamp corresponding to the start time, and/or the end time. In certain embodiments, each segment of the audio-form conversation and the synchronized text generated at process 306 is associated with a segment timestamp, the segment timestamp indicating the start time, the segment duration, and/or the end time.

In some embodiments, the audio-form conversation and the synchronized text are segmented at process 306 into a plurality of segments that include one or more segments corresponding to the same speaker. In some examples, each segment is spoken by a single speaker. For example, the processor 108 is configured to automatically distinguish one or more speakers of the audio-form conversation. In certain examples, multiple segments spoken by the same speaker are next to each other and/or are separated by one or more segments spoken by one or more other speakers. In some embodiments, FIG. 7 shows an audio-form conversation and its synchronized text in segmented form, and is discussed below.

In certain embodiments, once segmented at process 306, the audio-form conversation (e.g., the conversation in audio form received at process 302) and the synchronized text (e.g., the synchronized text generated at process 304) becomes a segmented audio-form conversation and a segmented synchronized text. In some embodiments, segments of the audio-form conversation and segments of the synchronized text have one-to-one correspondence relationship. In some examples, each segment of audio-form conversation corresponds to one segment of synchronized text, and the segment of synchronized text is synchronized with that segment of audio-form conversation. In certain examples, different segments of audio-form conversation correspond to different segments of synchronized text, and the different segments of synchronized text is synchronized with the different segments of audio-form conversation respectively.

At the process 308, a speaker label is automatically assigned to each segment of text synchronized to one segment of audio-form conversation as generated by the process 306. In some embodiments, the speaker label is automatically assigned (e.g., with no user input or minimal user input), and the speaker-assigned segmented synchronized text and corresponding segmented audio-form conversation are automatically generated. In some examples, the assigning of speaker label is performed by the processor 108 of the system 100. In certain examples, the assigning of speaker label is performed by the processor 108 and modifiable by a human. In some embodiments, the speaker label includes a speaker name and/or a speaker picture, as shown in FIG. 7, which is discussed below.

In some embodiments, at the process 308, one or more segments of text, which are synchronized to one or more corresponding segments of audio-form conversation, are grouped into one or more segment sets each associated with the same speaker pending a speaker label assignment. In those embodiments, the speaker label is assigned to each segment set, which in turn assign the speaker label to all segments belonging to the segment set.

In some embodiments, at the process 308, the speaker label is assigned to each segment of text synchronized to one corresponding segment of audio-form conversation, by matching a voiceprint of the corresponding segment of audio-form conversation to a reference voiceprint corresponding to a speaker label.

In certain embodiments, the process 308 includes assigning an "unknown" speaker label (e.g., with no name and/or with a placeholder picture) to a segment, as shown in FIG. 7, which is discussed below. In some embodiments, once assigned with one or more speaker labels at process 308, the segmented text that is synchronized with the segmented audio-form conversation (e.g., as generated at process 306) becomes a speaker-assigned segmented text that is synchronized with the segmented audio-form conversation, with a speaker label assigned to each segment.

In some embodiments, a speaker corresponds to a speaker label. In certain examples, a speaker label corresponds to a speaker name. In some examples, the speaker label corresponding to an unknown speaker does not include a speaker name. In certain examples, the process 206 automatically identifies a new speaker voiceprint, but the user has not provided the name and/or the picture of the speaker yet; hence the speaker is determined to be, for example, an unknown speaker (e.g., as shown in FIG. 10).

At the process 310, a transformed conversation (e.g., including the speaker-assigned segmented synchronized text and its corresponding segmented audio-form conversation) is sent. For example, the transformed conversation is sent from the processor 108 to the controller 102 and/or to the presenter 110. In some embodiments, the transformed conversation sent at process 310 includes the speaker-assigned segmented synchronized text and its corresponding segmented audio-form conversation as generated by the process 308. In certain embodiments, the transformed conversation sent at process 310 includes the segmented audio-form conversation and the segmented synchronized text as generated by the process 306.

In some embodiments, the transformed conversation includes segmented audio, segmented text synchronized with segmented audio, speaker labels (e.g., name and/or picture) associated with the segments, and/or metadata (e.g., including a date, a time, a duration and/or a title). In certain embodiments, the transformed conversation is sent automatically, for example, by the processor 108.

As discussed above and further emphasized here, FIG. 3 is merely an example, which should not unduly limit the scope of the claims. One of ordinary skill in the art would recognize many variations, alternatives, and modifications. In some examples, the process 304 and the process 306 are modified such that segmenting the conversation in audio form occurs before synchronized text is transcribed for each segment. In certain examples, the process 308, at which one or more speaker labels are assigned, occurs before transcribing the conversation in audio form and/or segmenting the conversation in audio form.

In certain embodiments, transcribing, segmenting, and/or assigning speaker label to a conversation are performed with the aid of a user and/or human. For example, a transcript automatically generated (e.g., at process 304) is editable (e.g., by a user and/or human). In yet another example, segments automatically generated (e.g., at process 306) is editable to split one segment and/or combine multiple segments (e.g., by a user and/or human). In yet another example, speaker labels automatically assigned (e.g., at process 308) are editable (e.g., by a user and/or human).

In certain embodiments, the conversation to which transcribing, segmenting, and/or assigning speaker label are performed includes the conversation in audio form or the transcription. In some examples, the conversation in audio form is first segmented and/or speaker-assigned, and followed by having each segment transcribed to generate the synchronized text associated with each segment of conversation in audio form. In certain examples, the conversation in audio form is first transcribed to generate synchronized transcript, and followed by segmenting and/or assigning speaker label to the transcript. For example, the conversation in audio form is not directly segmented, but instead is indirectly segmented or remains unsegmented and merely corresponds to the transcript in a word-by-word relationship (e.g., each transcribed text corresponds to a timestamp with an associated audio).

Returning to FIG. 2, at process 208, one or more transformed conversations (e.g., the transformed conversation sent at the process 310) are presented. In certain embodiments, the process 208 includes presenting the transformed conversation (e.g., including the speaker-assigned segmented synchronized text and its corresponding segmented audio-form conversation) with the presenter 110. In certain examples, the text is synchronized with the audio-form conversation at both the segment level and the word level.

In certain embodiments, the process 208 includes presenting the metadata associated with the transformed conversation. For example, the metadata include a date (e.g., of capturing, processing, or presenting), a time (e.g., of capturing, processing, or presenting), a duration (e.g., of the conversation), and/or a title, as shown in FIG. 5 In some embodiments, the process 208 includes presenting a player, such as an audio player. For example, the audio player is a navigable audio player (e.g., as shown in FIG. 7) configured to provide control (e.g., to a user) such that the presenting of the transformed conversation is interactive.

FIG. 102 is a simplified diagram showing the process 208 for presenting one or more transformed conversations, according to some embodiments of the present invention. This diagram is merely an example, which should not unduly limit the scope of the claims. One of ordinary skill in the art would recognize many variations, alternatives, and modifications. In various examples, the process 208 includes process 10202 for presenting sync status, process 10204 for presenting recent activities, process 10206 for presenting grouping information, process 10208 for presenting labeling information, process 10210 for presenting editable conversations, process 10212 for presenting shareable conversations, process 10214 for presenting a recorder, and/or process 10216 for presenting search results.

In some examples, some or all processes (e.g., steps) of the process 208 are performed by the system 100. In certain examples, some or all processes (e.g., steps) of the process 208 are performed by a computer and/or a processor directed by a code. For example, a computer includes a server computer and/or a client computer (e.g., a smartphone). In some examples, some or all processes (e.g., steps) of the process 208 are performed according to instructions included by a non-transitory computer-readable medium (e.g., in a computer program product, such as a mobile app and/or a web app). For example, a non-transitory computer-readable medium is readable by a computer including a server computer and/or a client computer (e.g., a smartphone). As an example, instructions included by a non-transitory computer-readable medium are executed by a processor including a processor of a server computer and/or a processor of a client computer (e.g., a smartphone).

In certain examples, the process 10202 includes presenting a sync status indicator 402, a sync progress bar 404, and a time-remaining indicator 406, as shown in FIG. 4. In some examples, the sync status indicator 404 displays a sync incomplete indicator, a sync complete indicator, and/or a syncing indicator. In various embodiments, the sync progress bar 404 indicates the percentage of sync completed or incomplete. In some examples, the time-remaining indicator 406 presents the time remaining for the sync to complete. In some examples, the time remaining for the sync to complete corresponds to the sync progress bar 404.

In various embodiments, the process 102014 includes presenting recent conversations 408, and/or presenting recent group activities 410. In some embodiments, the process 10204 is implemented according to FIG. 4. In some examples, presenting recent conversations 408 includes presenting one or more of the most recently recorded conversations and/or one or more of the most recently transformed conversations. In various examples, presenting recent group activities 410 includes presenting recent conversations of one or more groups. In some examples, each conversation is assigned to one or more groups, wherein each group has one or more group members.

Figure 8:
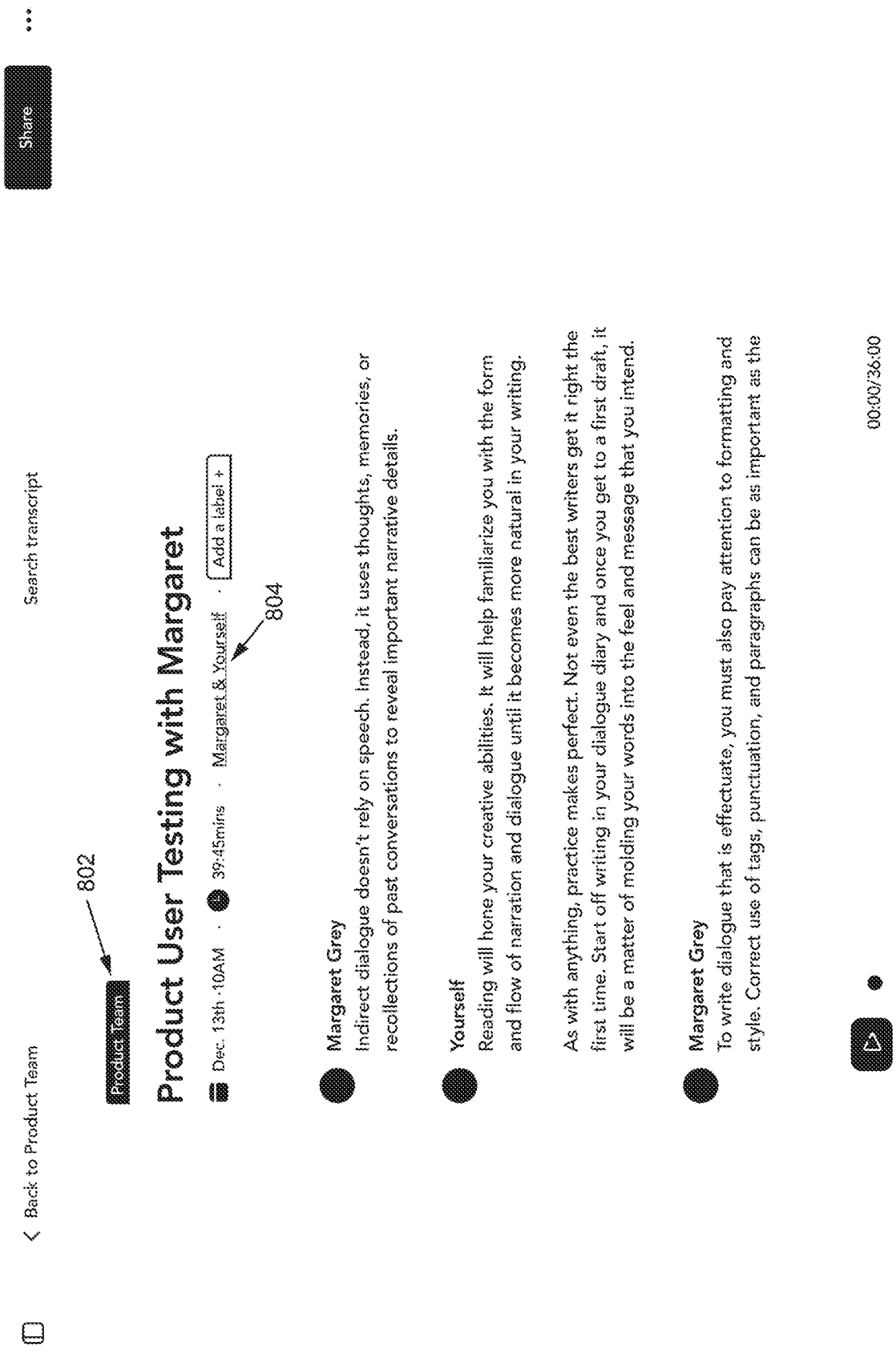
Figure 35:
Figure 36:
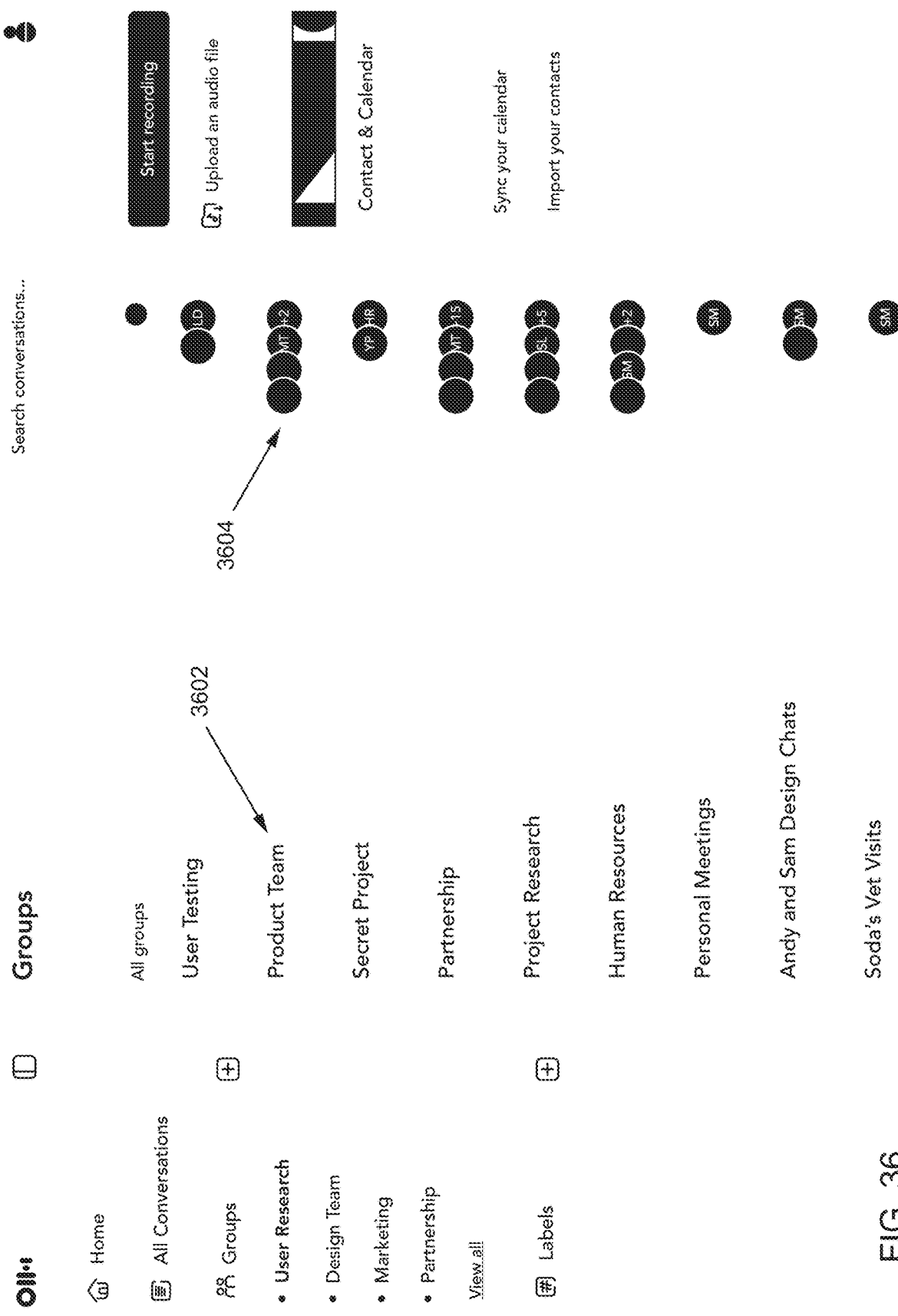
Figure 40:
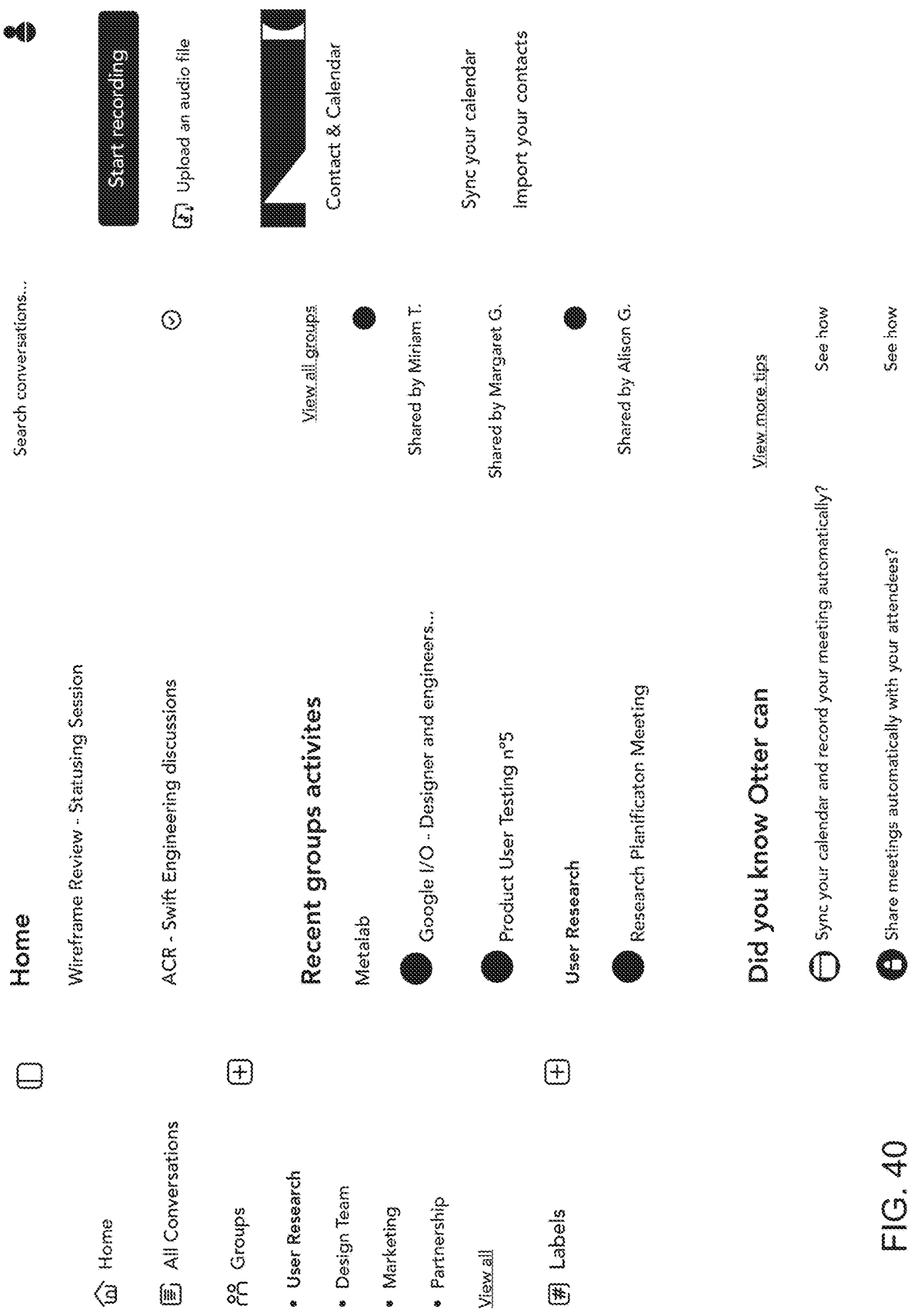
Figure 41:
Figure 42:
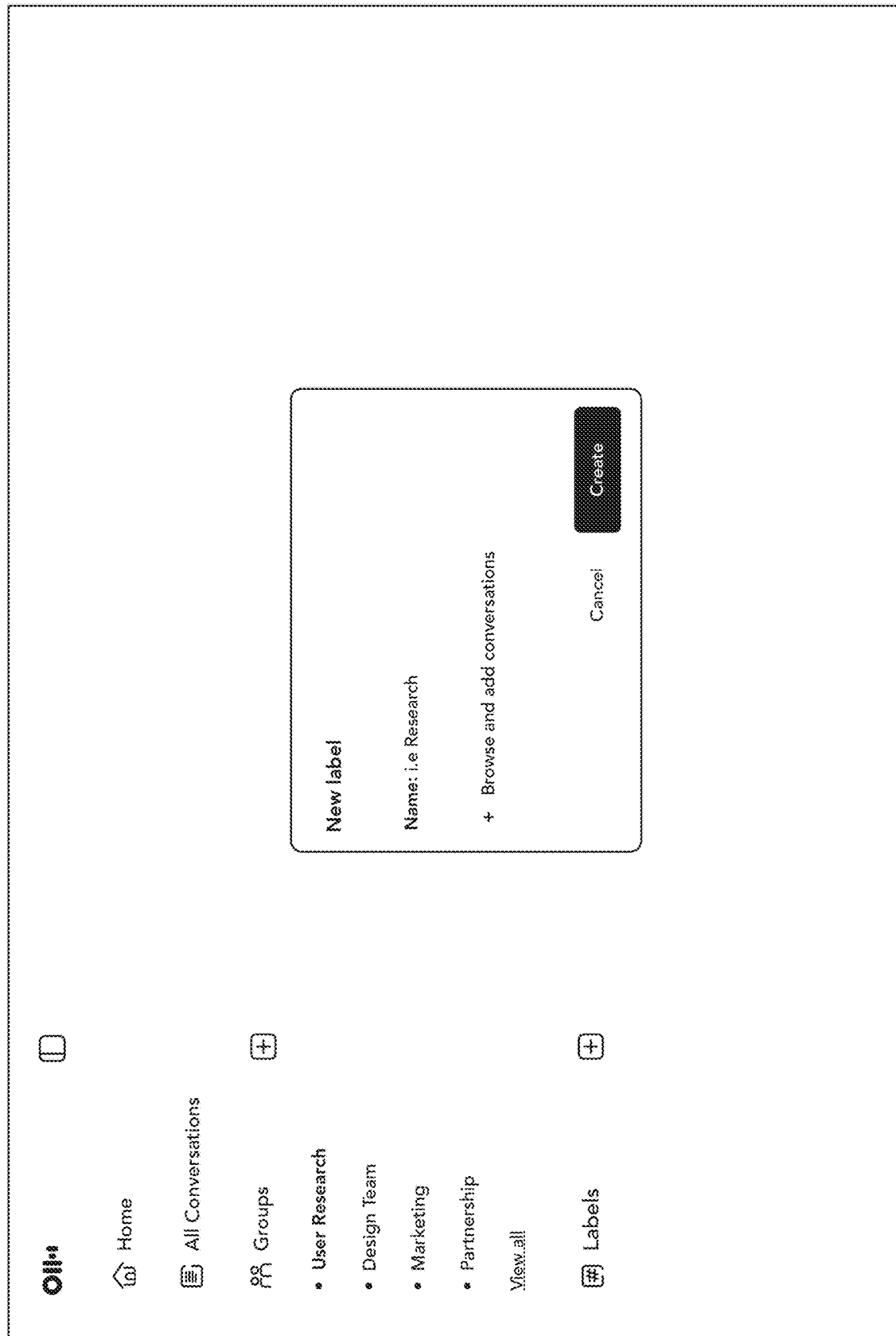
Figure 43:

In some examples, the process 10206 includes presenting a first group name indicator 3602, presenting a first group member indicator 3604, presenting a second group name indicator 802, presenting a second group member indicator 804, and/or presenting a third group member indicator 3502. In some embodiments, the process 10206 is implemented according to FIG. 36, FIG. 8, and/or FIG. 35. In certain examples, the process 10206 includes presenting a group listing page having a listing of one or more groups (e.g., created by a user) by group names (e.g., as shown in FIG. 36). In some examples, the first group member indicator 3604 is positioned next to the first group name indicator 3602 to help indicate at least one or more of the group members associated with the group (e.g., as shown in FIG. 36). In various embodiments, the second group name indicator 802 and the second group member indicator 804 are presented next to a conversation title to help indicate which group the conversation is assigned to and the names or pictures of one or more of the group members of the group (e.g., as shown in FIG. 8). In certain examples, the third member indicator 3502 helps indicate at least one or more of the group members associated with a group, such as on a group page where a listing of conversations assigned to the group is presented (e.g., as shown in FIG. 35).

Figure 48:
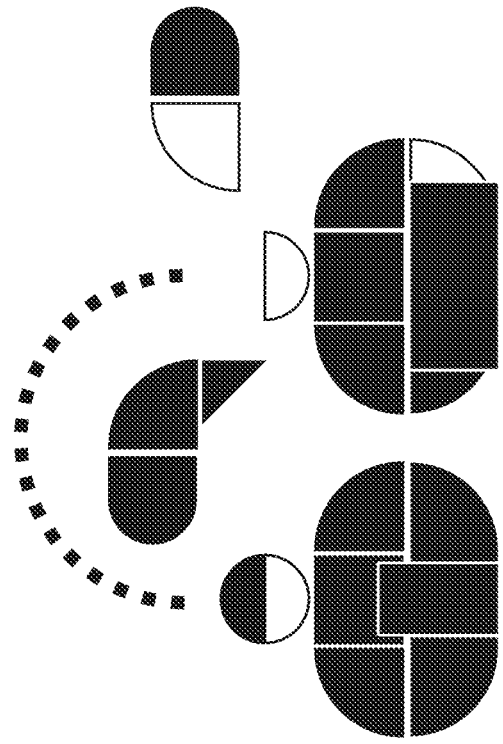
Figure 49:
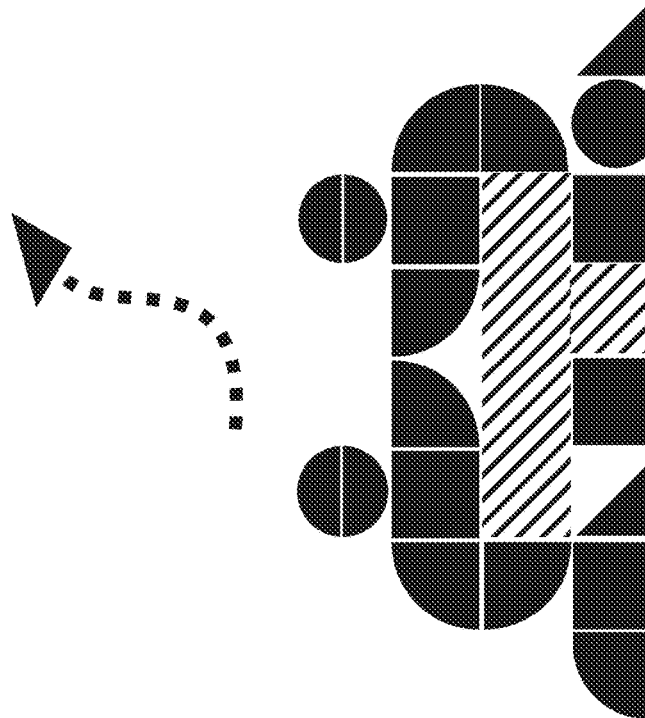
Figure 50:
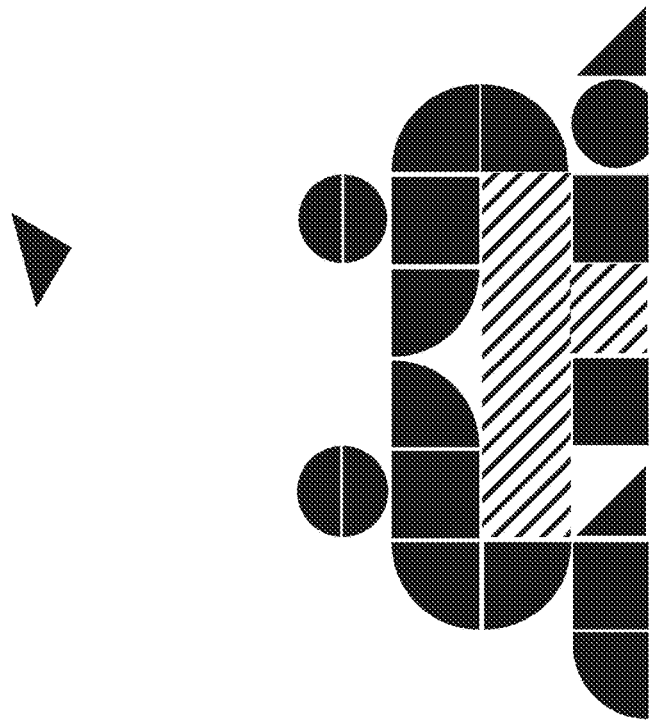
Figure 52:
Figure 53:
Figure 55:
Figure 58:

In certain examples, a conversation is assignable to one or more groups, wherein each group includes one or more group members. In some embodiments, a group is manually created, such as by assigning a group name and manually adding group members. In some embodiments, a group is automatically created (e.g., by the processor 108), such as based on the conversation's speaker information, location, time, and/or topic. In some examples, a conversation is associated with a calendar event of a synced calendar that provides information useful for automatically creating a group. In various embodiments, contacts or an address book of a user is synced to provide information useful for automatically creating a group. For example, the system is configured for a user to create a system profile with a Google account or to link his/her Google account such that the user's Google Calendar and/or Google Contacts are synced with the system profile (e.g., as shown in FIG. 48 and/or FIG. 55). In some examples, a group is first created (e.g., by an admin user), which may initially have no group members and have no conversations assigned to the group. In certain examples, one or more conversations can be assigned to a group that has been created but have not yet had any group members joined, such that the group includes the one or more conversations but no group members, where the conversations are not yet shared via the group. In certain examples, one or more group members join a group having one or more conversations, such that the one or more conversations may be shared automatically with the one or more group members. In some examples, one or more group members join a group having no conversations, and may automatically be shared with any future conversations added to the group. In various examples, group information and settings are editable, such as manually by a user and/or automatically (e.g., by the processer 108). In certain examples, a conversation assigned to a group is viewable, editable, and/or shareable by one or more of the group's group members. For example, the system is configured for one or more of the group members to edit a conversation assigned to the group at the same time with the edits applied in real time for all group members.

Figure 44:
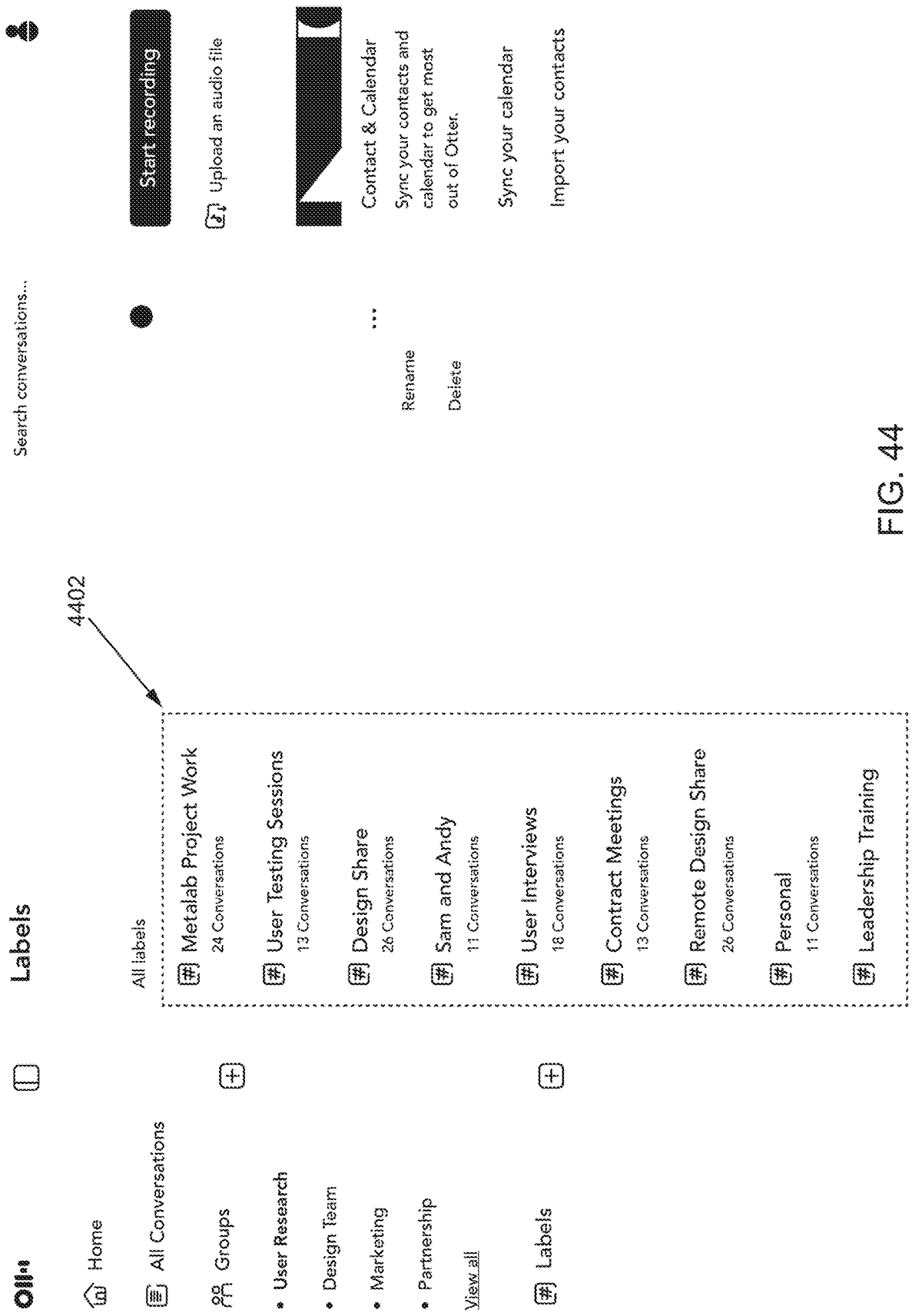
Figure 45:
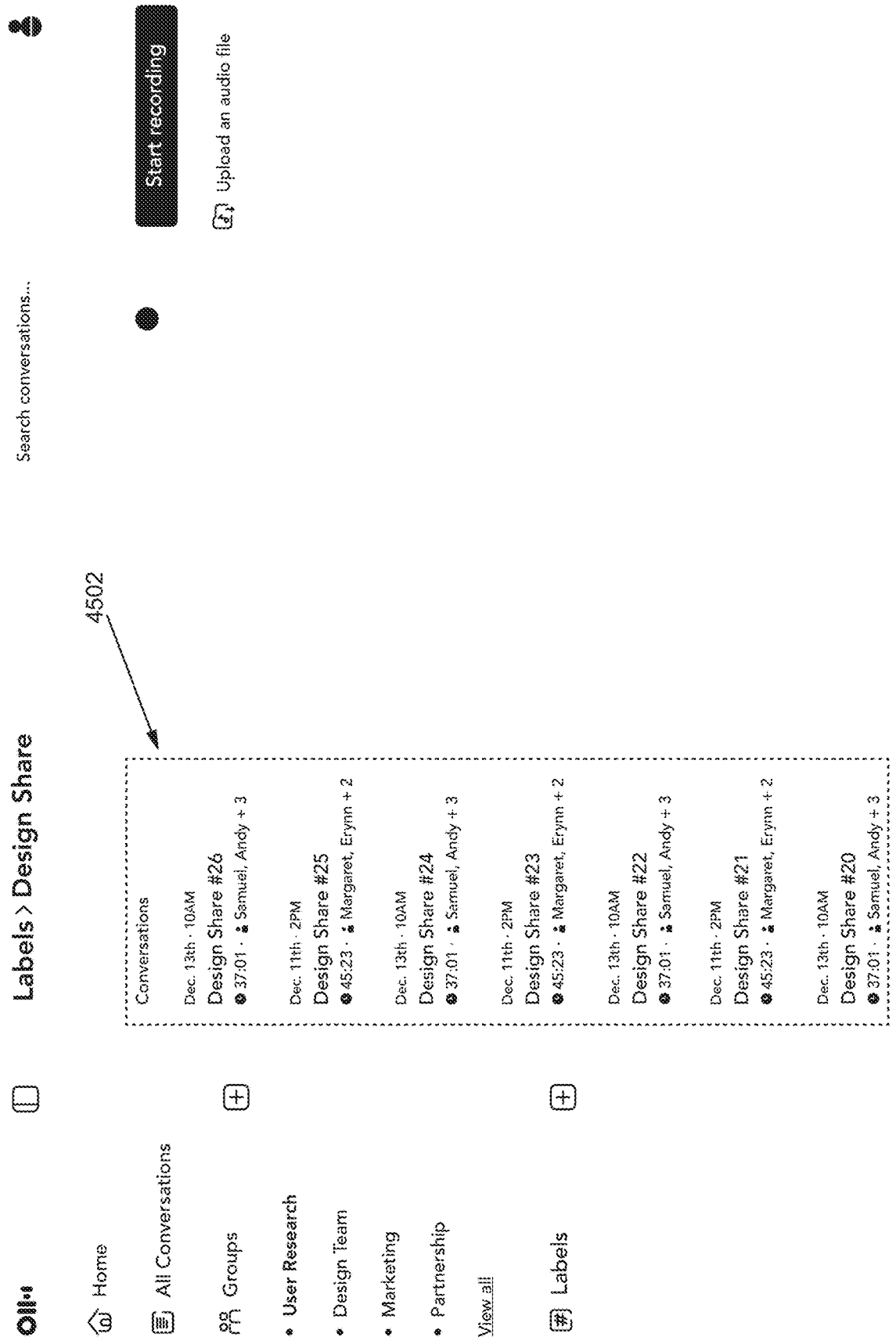
Figure 46:
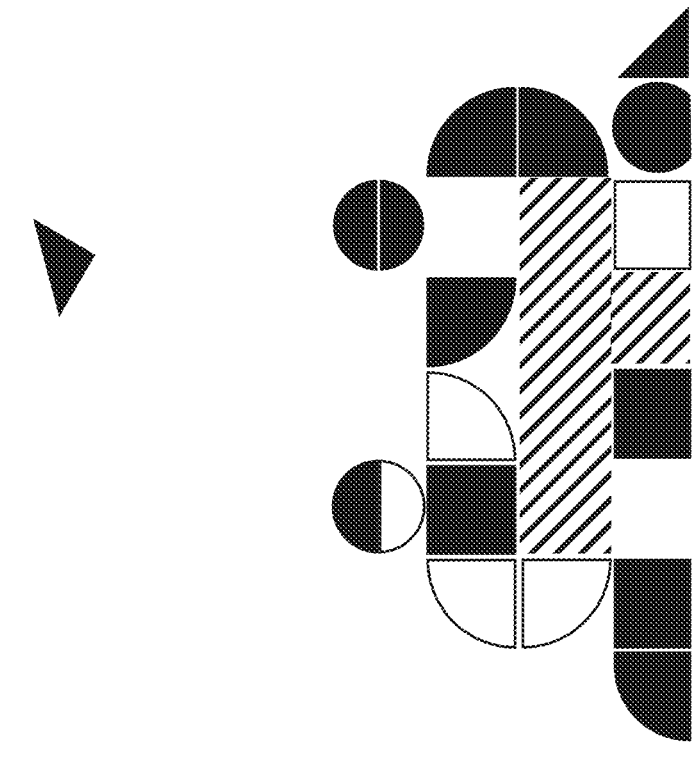
Figure 47:
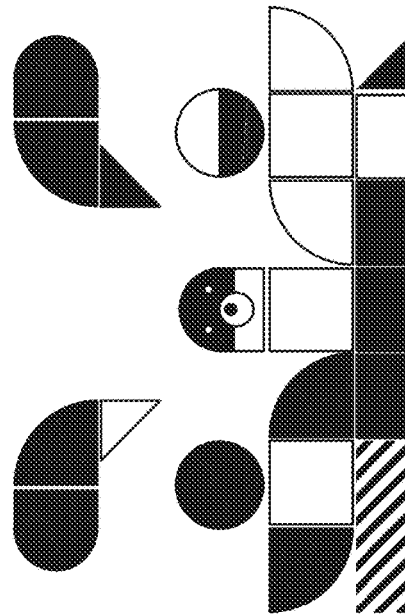

In various embodiments, the process 10208 includes presenting a listing of labels 4402, and/or a listing of conversations assigned with a common label 4502. In some embodiments, the process 10208 is implemented according to FIG. 44, and/or FIG. 45. For example, a listing of labels 4402 has a listing of one or more labels (e.g., created by a user). In certain examples, the listing of labels 4402 includes a conversation count indicator positioned next to each label to indicate the amount of conversations assigned with the label. In certain examples, a listing of conversations assigned with a common label 4502 is shown in a label page (e.g., as shown in FIG. 45). In various embodiments, the system is configured such that one or more labels are assignable to a conversation. In certain examples, one or more labels are manually assignable (e.g., by a user) and/or automatically assignable (e.g., according to conversation title, metadata, and/or transcript). In some examples, the labeling changes apply to only the user making the changes to the conversation. In other examples, the labeling changes apply to all users having access to the conversation (e.g., a shared conversation).

Figure 9:
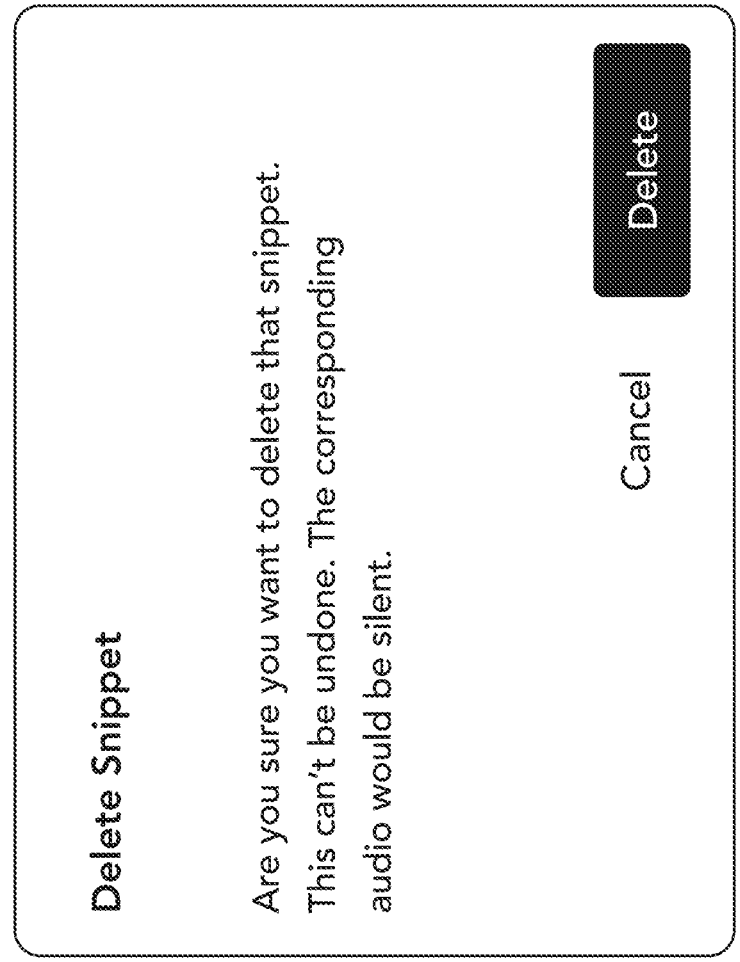
Figure 11:
Figure 25:
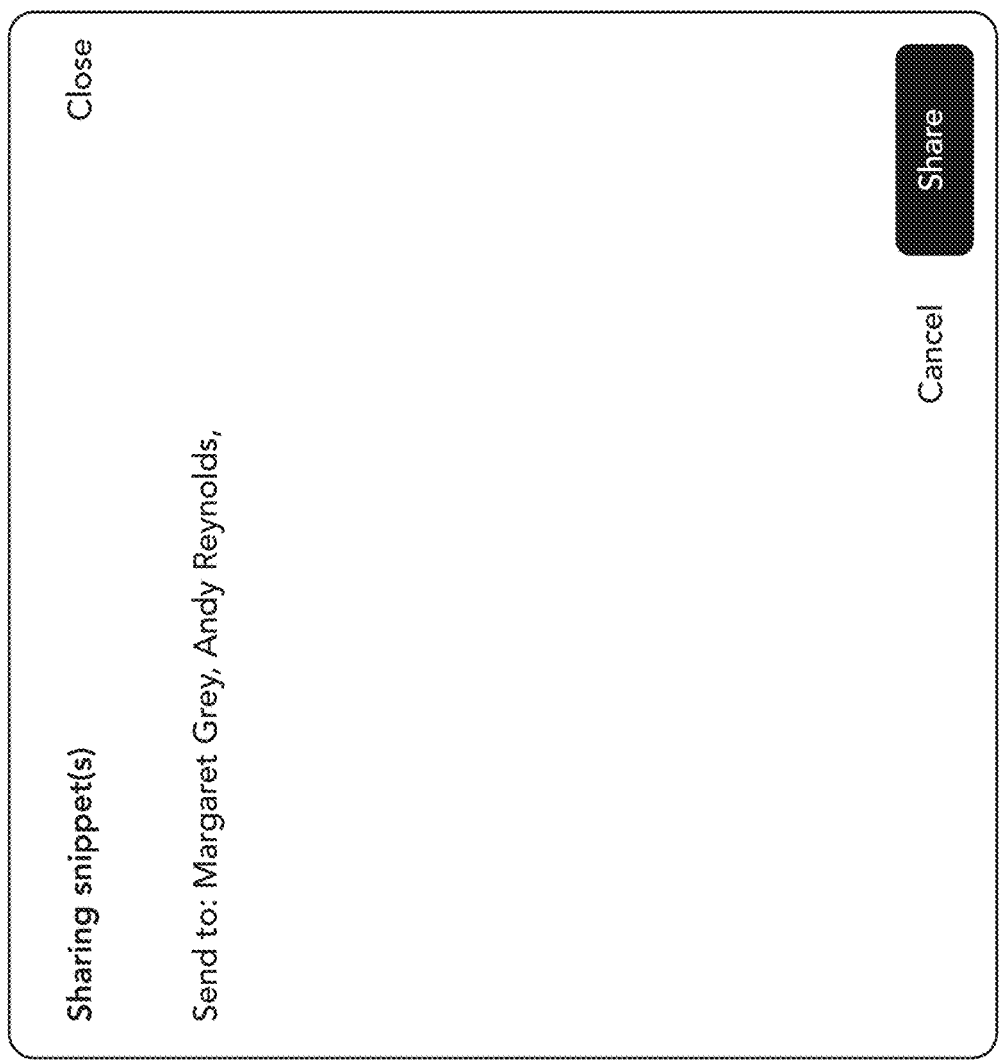

In certain examples, the process 10210 includes presenting editable conversations to which one or more of delete, hide, merge, split, and speaker-assignment is applicable, such as applicable to one or more of conversation segments of the conversation. In some examples, a conversation segment is referred to as a conversation snippet or a conversation bubble. In some examples, a transformed conversation includes one or more snippets, wherein each snippet includes one or more conversation segments. In various examples, deleting a snippet is not reversible such that a deleted snippet is removed from the conversation for all users who have access to the conversation. In some examples, deleting a snippet removes the transcript text as well as the corresponding audio (e.g. as shown in FIG. 9). In some examples, hiding a snippet is reversible such that a hidden snippet remains in the conversation and is revealable. For example, a hidden snippet is viewable by the user who hid the snippet, such as in a stroked-out form (e.g., as shown in FIG. 13), whereas the hidden snippet is hidden from others who have access to the conversation. In various embodiments, two or more snippets are mergeable (e.g., as shown in FIG. 16, FIG. 17, FIG. 19, and/or FIG. 20). For example, a first snippet having a first speaker label and a first starting timestamp and a second snippet having a second speaker label and a second starting timestamp are mergeable to create a merged snippet having a new speaker label (e.g., same as the first speaker label) and a new timestamp (e.g., same as the first starting timestamp). In certain examples, a snippet is splittable into two or more snippets each having a new speaker label and a new starting timestamp. In various embodiments, speaker label is assignable and/or re-assignable, as shown in FIG. 32 and/or FIG. 33.

Figure 26:
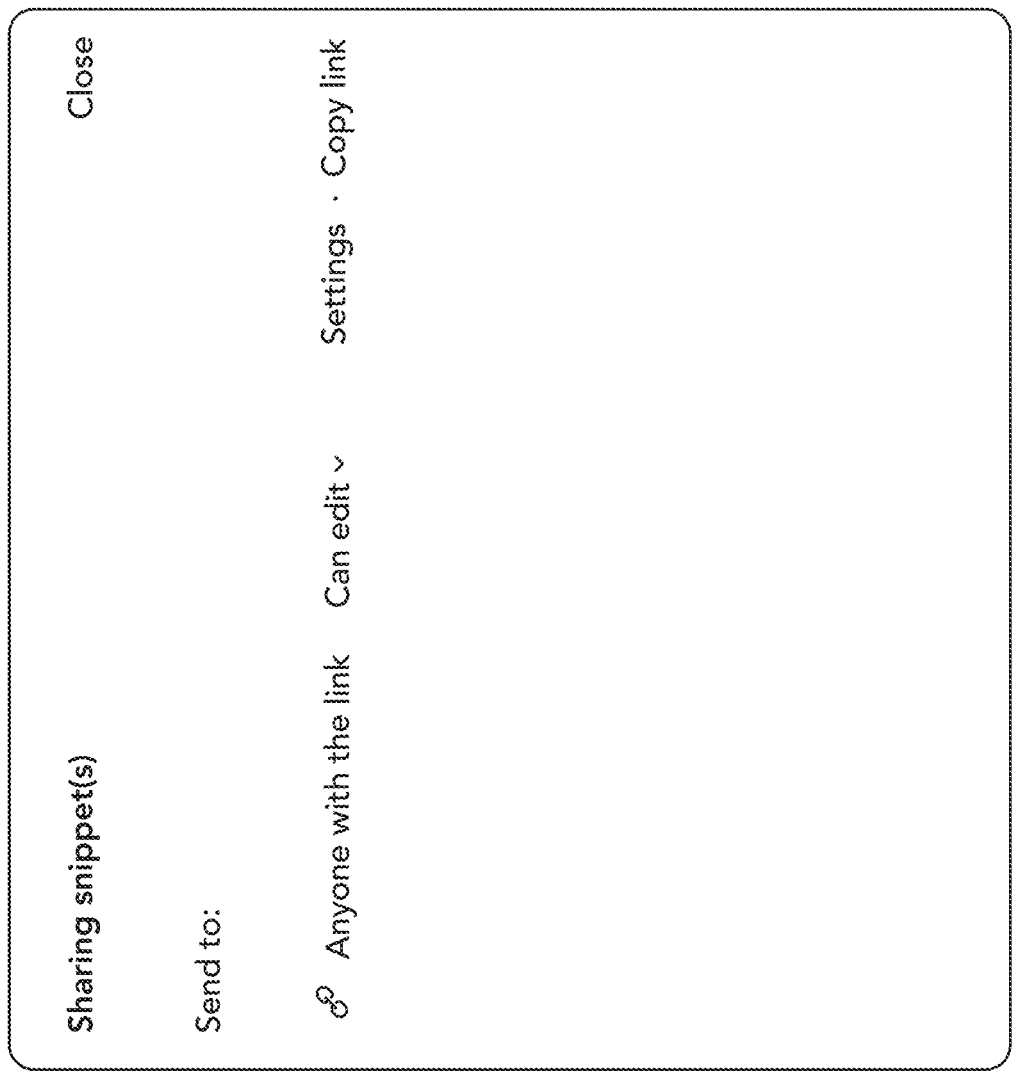
Figure 27:
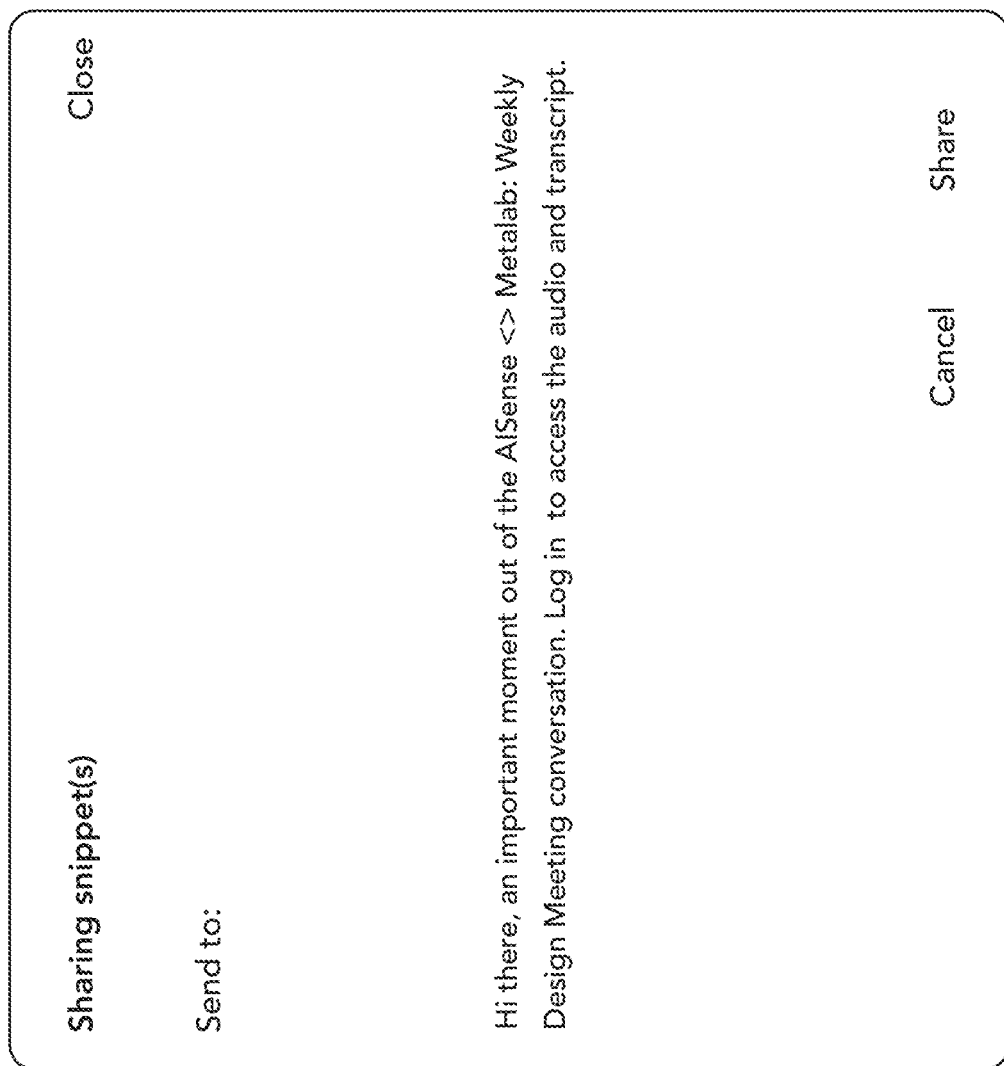
Figure 30:
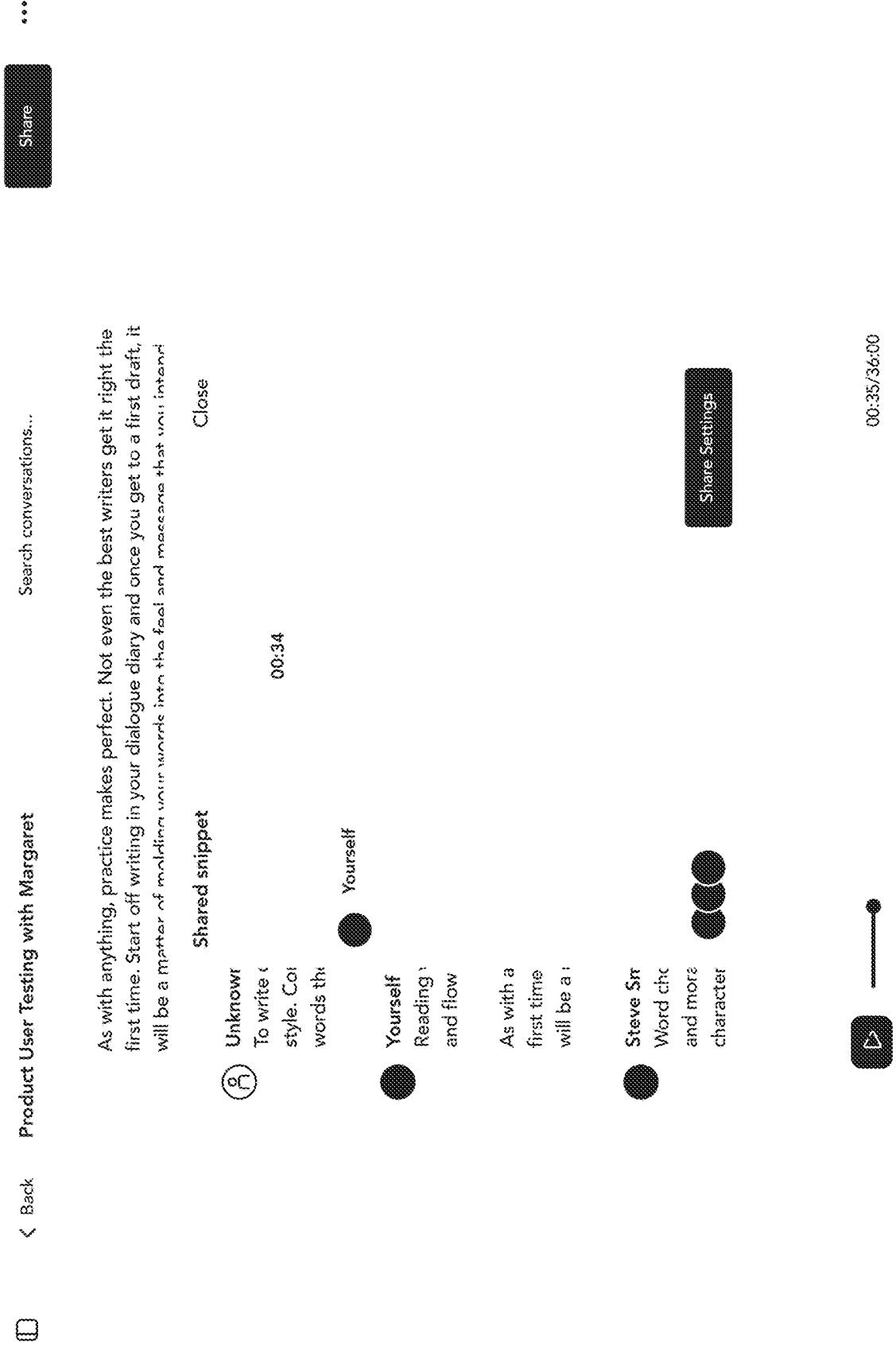
Figure 31:
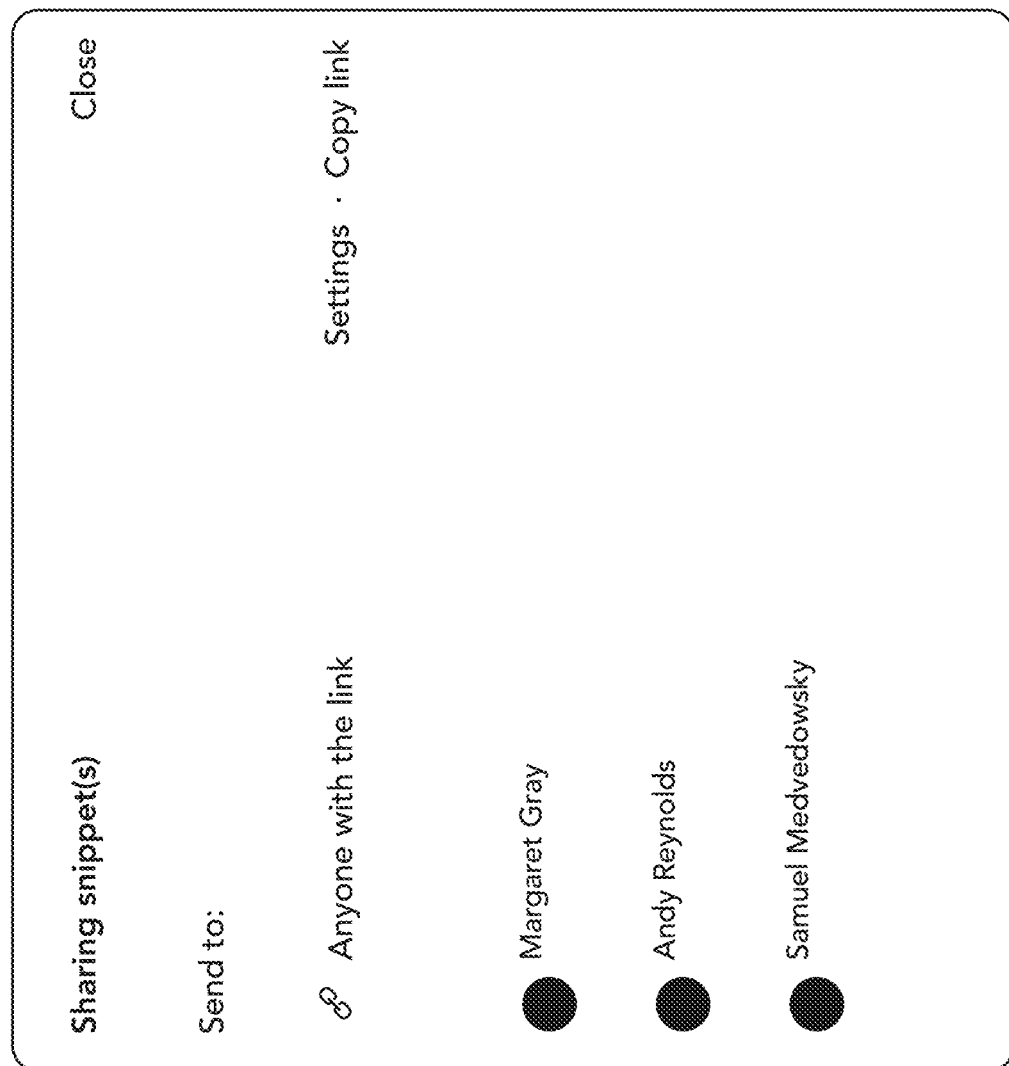
Figure 34:
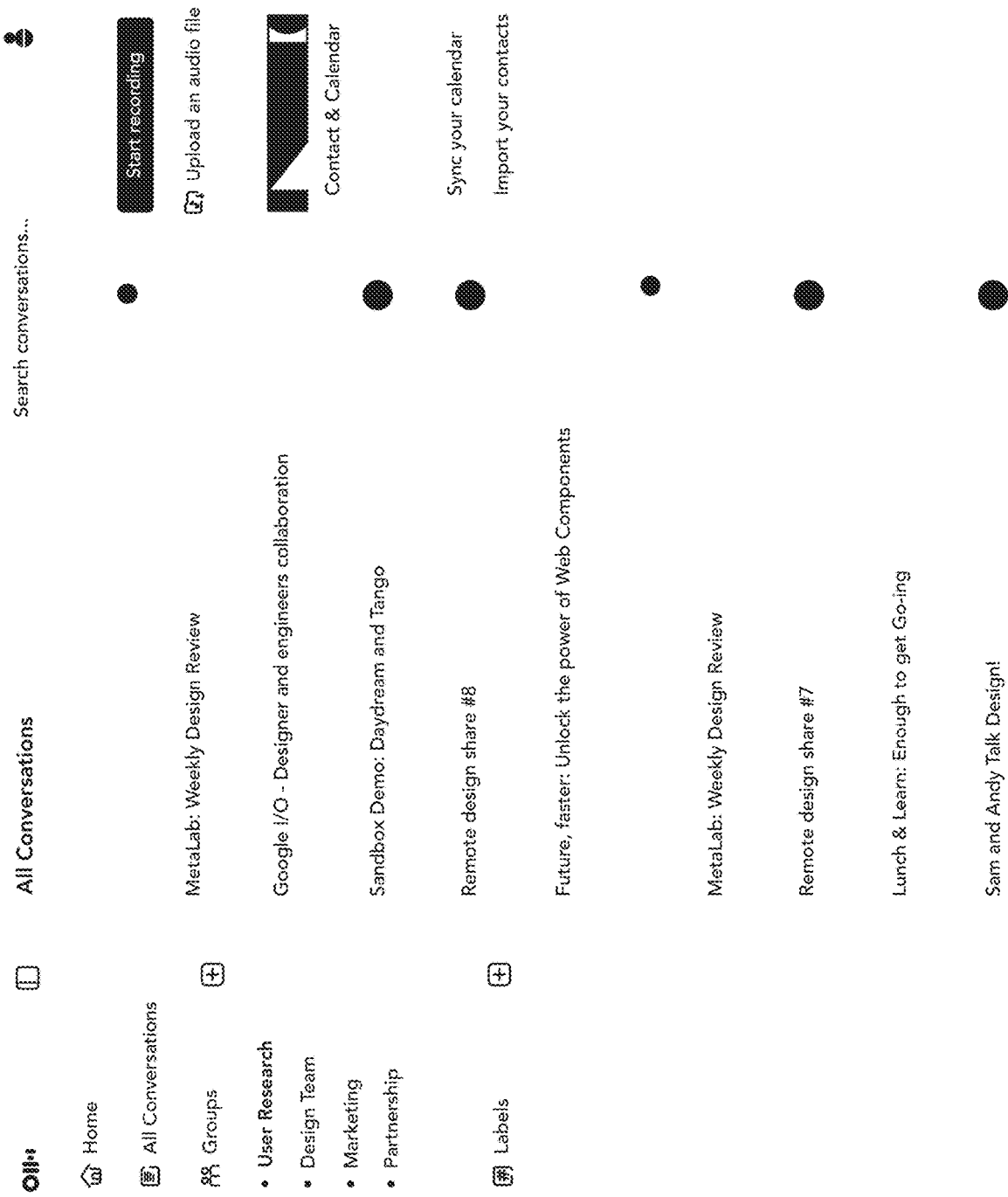
Figure 79:
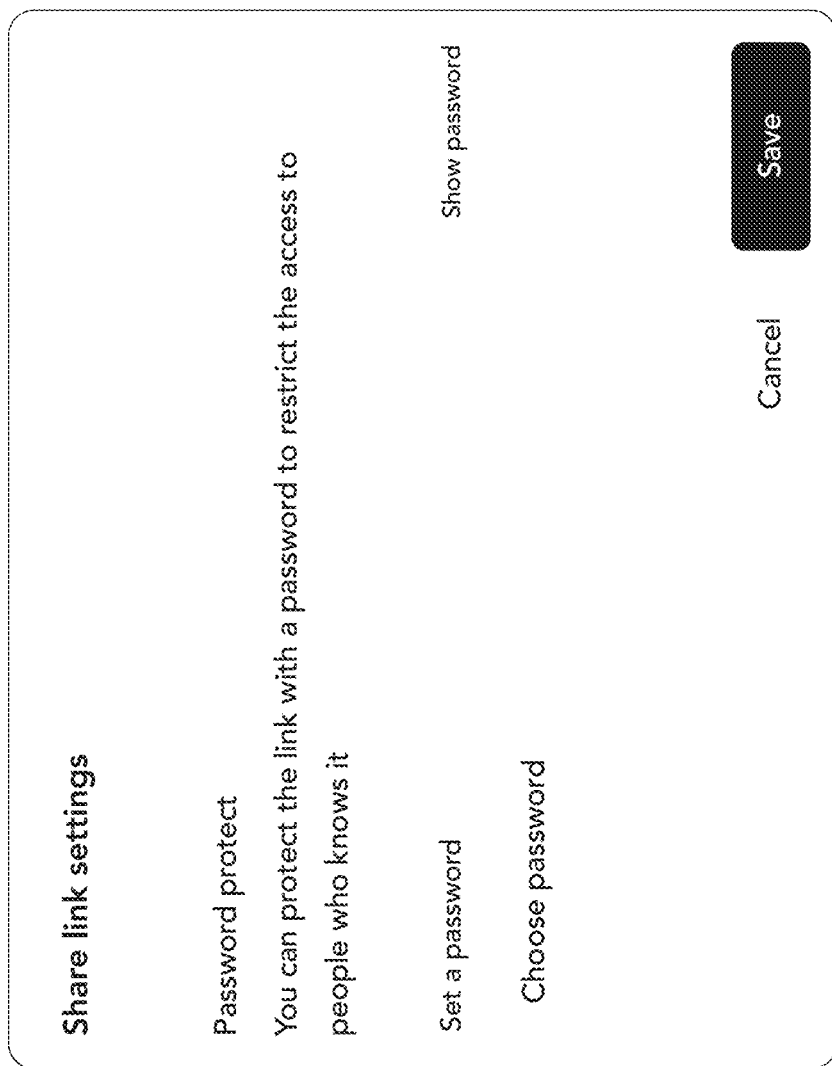
Figure 80:
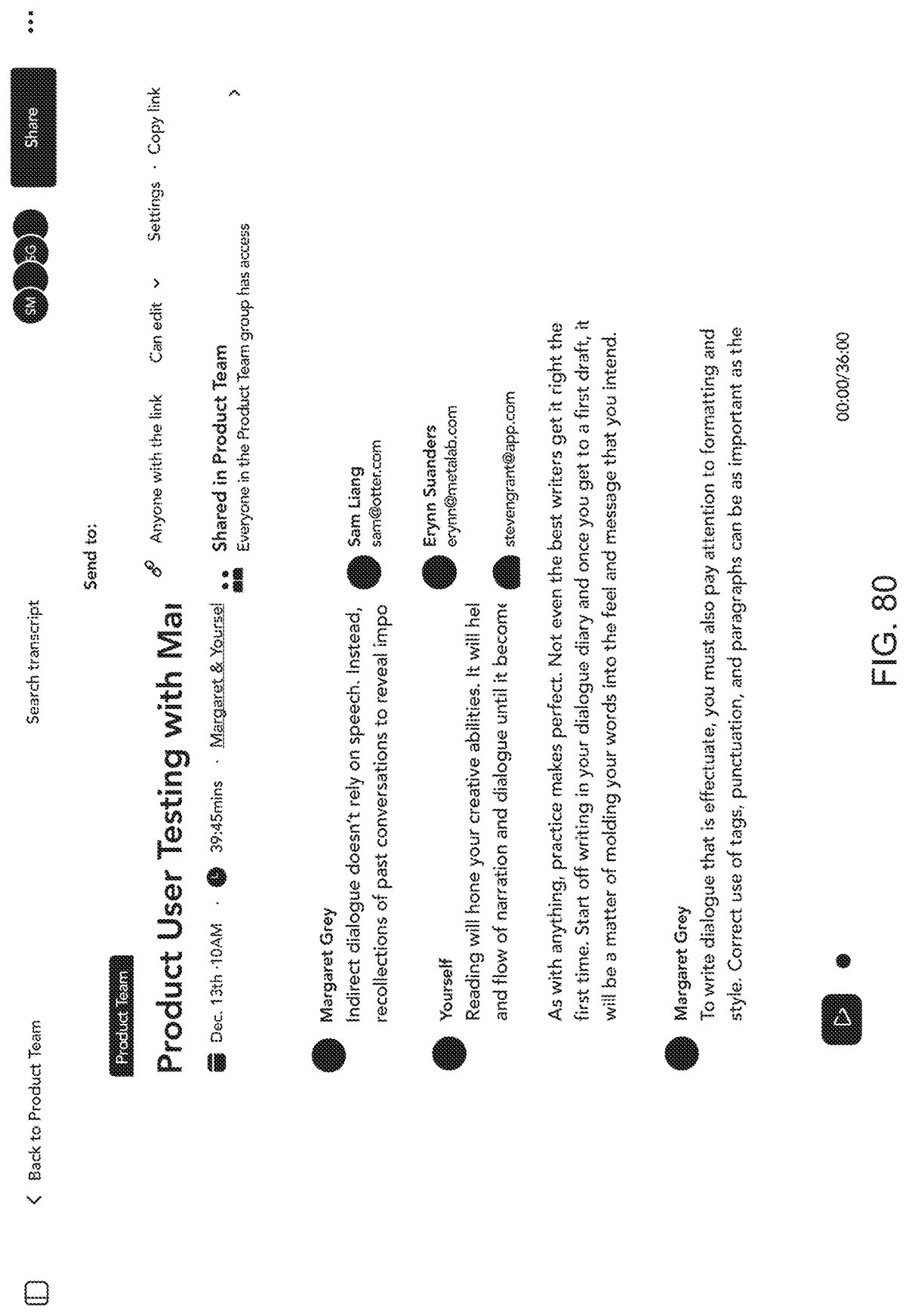
Figure 94:
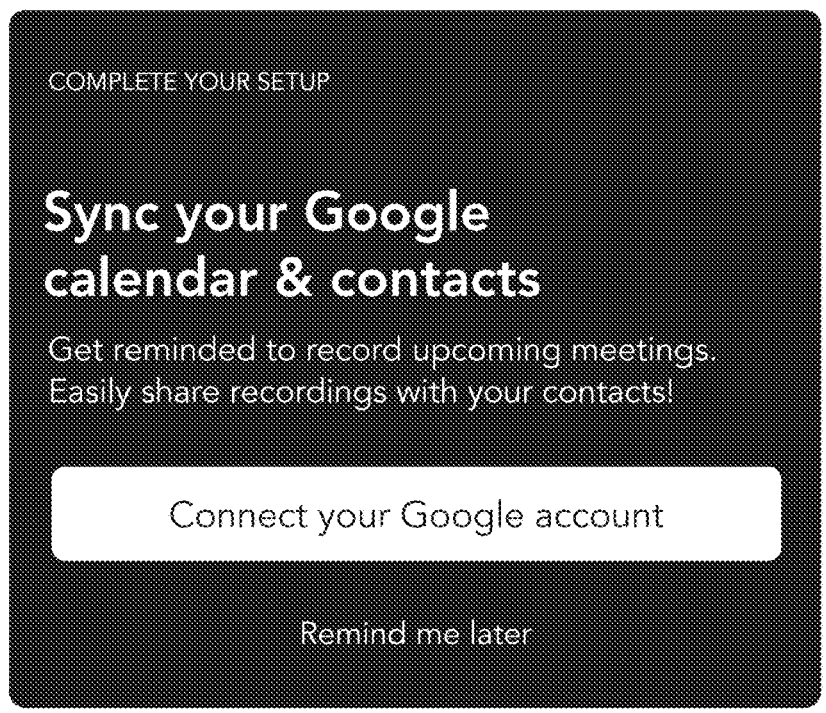

In various embodiments, the process 10212 includes presenting conversations shareable selectively or wholly (e.g., as shown in FIG. 23). For example, one or more snippets of a transformed conversation are selectable and shareable such that the non-selected portions of the conversation are not accessible (e.g., viewable) by recipients of a sharing invitation to the selected conversation content. In some examples, a conversation is shareable within the application to another user, such as to a group member. In various examples, a conversation is shareable with external recipients, such as via a universal resource locator (URL). For example, a shared conversation or snippet is accessible by all who has the URL (e.g., as shown in FIG. 26). In some examples, access is revocable (e.g., as shown in FIG. 31), such as by the user who granted access. In certain examples, access is configurable to be view-only, can-edit, or password-protected (e.g., as shown in FIG. 79). In some examples, access is grantable to a recipient, a plurality of recipients, or a group (e.g., as shown in FIG. 80). In some examples, the system is configured such that a conversation assigned to a group is automatically shared to the group's group members such that each member is automatically granted with access.

Figure 56:
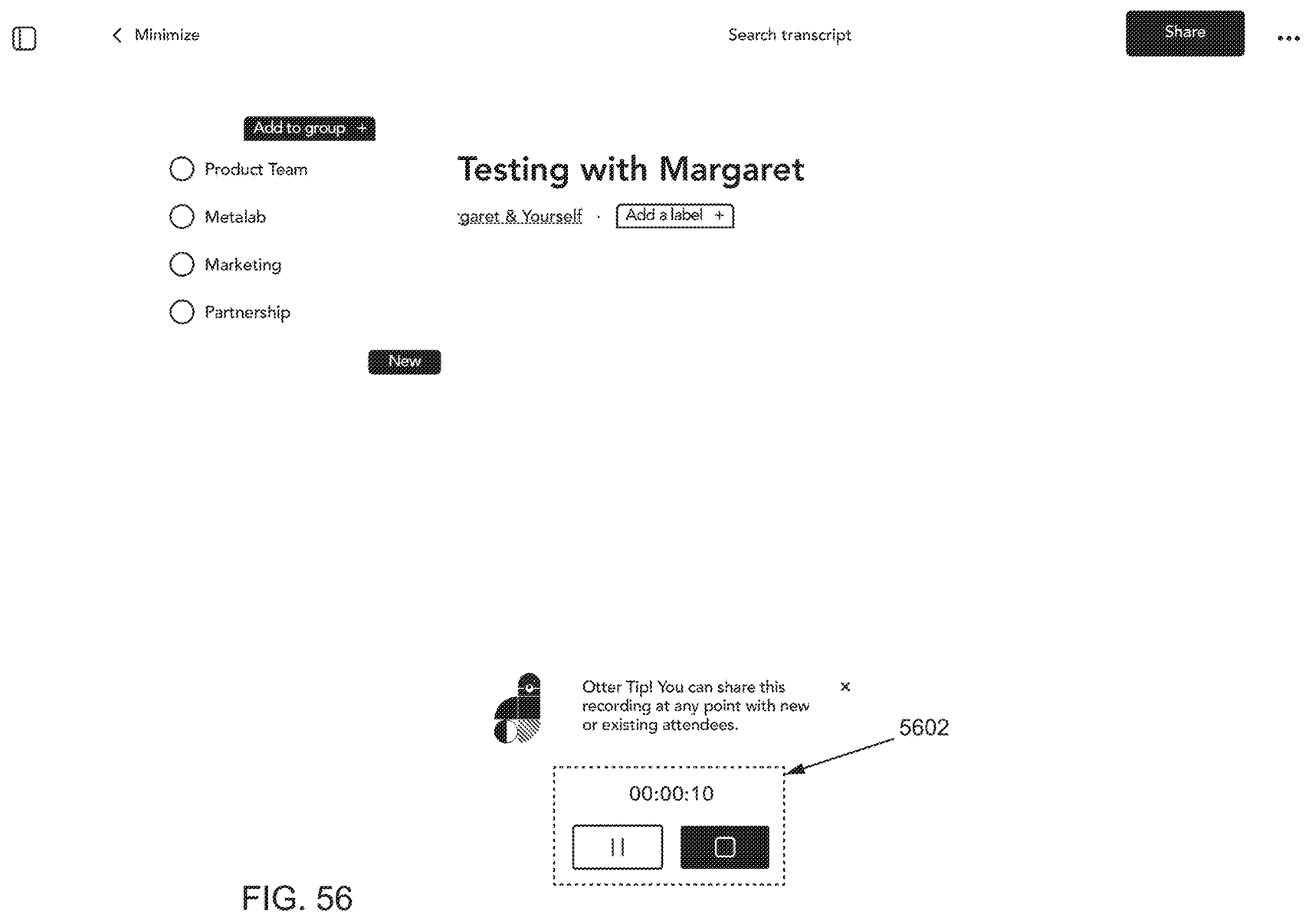
Figure 59:
Figure 61:
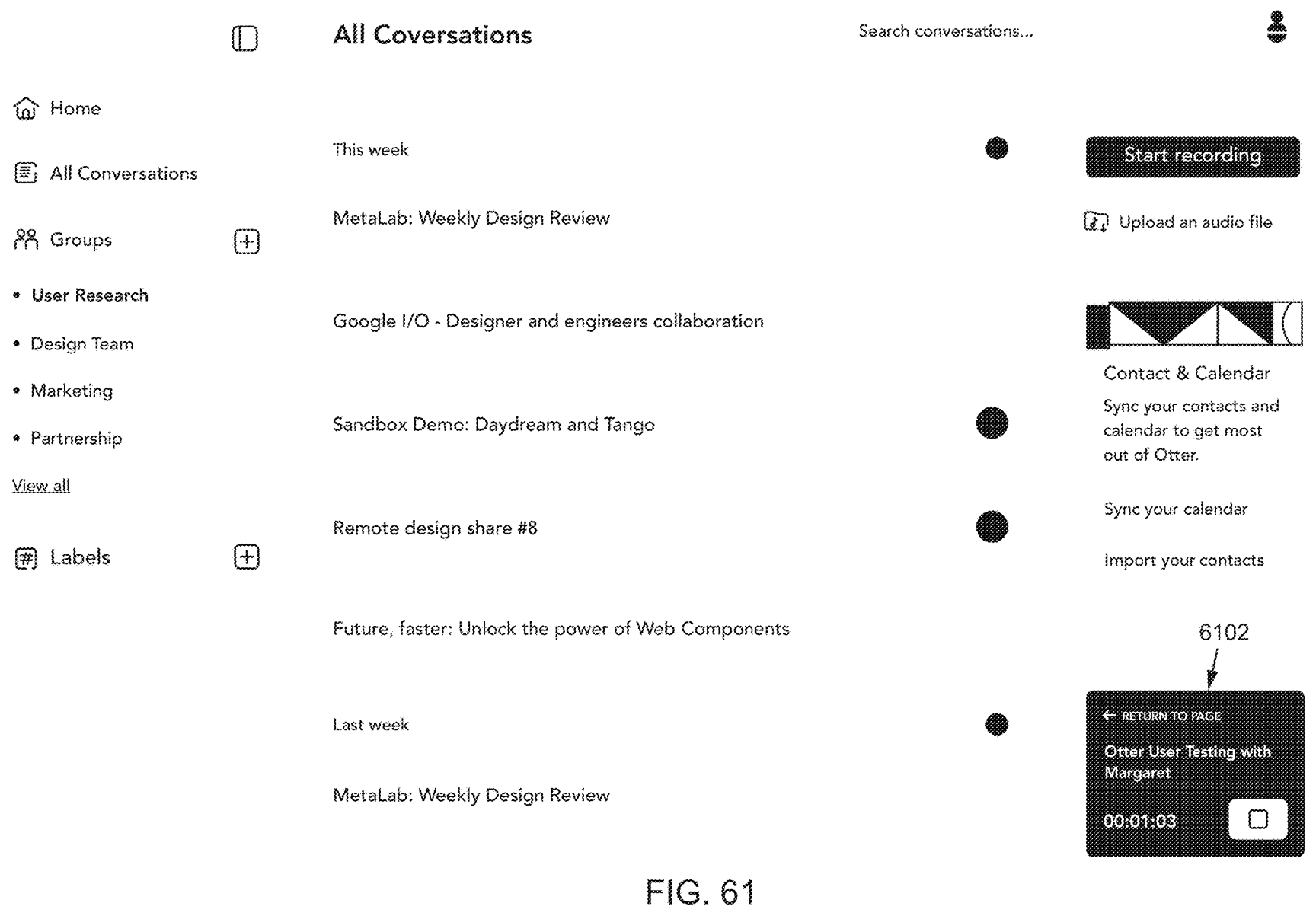
Figure 64:

In some embodiments, the process 10214 includes presenting a recorder in a conversation page (e.g., as shown in FIG. 56). In certain examples, content (e.g., grouping, labeling, title, transcript) of the conversation page is editable and/or updatable while a recorder 5602 indicates the recording status (e.g., recording, paused, recorded time). In certain examples, a shared live conversation (e.g., a live-recording) is updated in real-time while the recorder indicates the status of the recording (e.g., as shown in FIG. 59). In some examples, the content (e.g., transcript) of a shared live conversation is configurable to be updated automatically according to the live recording. In certain examples, content update is pushed to all viewers who have access to the shared conversation in real time or near real time. In some examples, the process 10214 includes presenting a recorder in a non-conversation page, such as a home page or a listing page (e.g., as shown in FIG. 61). In certain examples, the recorder 6102 is configured to display recording status of a conversation while the system receives navigation commands (e.g., from a user). In various examples, the recorder 6102 displays time recorded, conversation title, a stop button, and/or a return-to-page button.

In some examples, the process 10214 includes presenting a recorder in an account setup page, such as a voiceprint initialization, calibration, or training page (e.g., as shown in FIG. 51). For example, a recorder 5102 is configured to be activatable for a user to record his/her voice to help improve the system's (e.g., system 100) abilities, performance, accuracy, and/or speed in transforming a conversation. In certain embodiments, the system (e.g., the presenter of the system) is configured to present a voiceprint calibration script for a user to read to help record a voiceprint calibration recording. In some examples, the voiceprint calibration script is selected (e.g., by the processor of the system) to specifically help establish a voiceprint for the user. In various examples, the voiceprint includes a language model component and an acoustic model component that are created and/or improved by receiving the voiceprint calibration recording. In some examples, the sensor 106 of FIG. 1 is configured to capture the voiceprint calibration recording to help establish and/or improve a voiceprint of a user.

Figure 65:
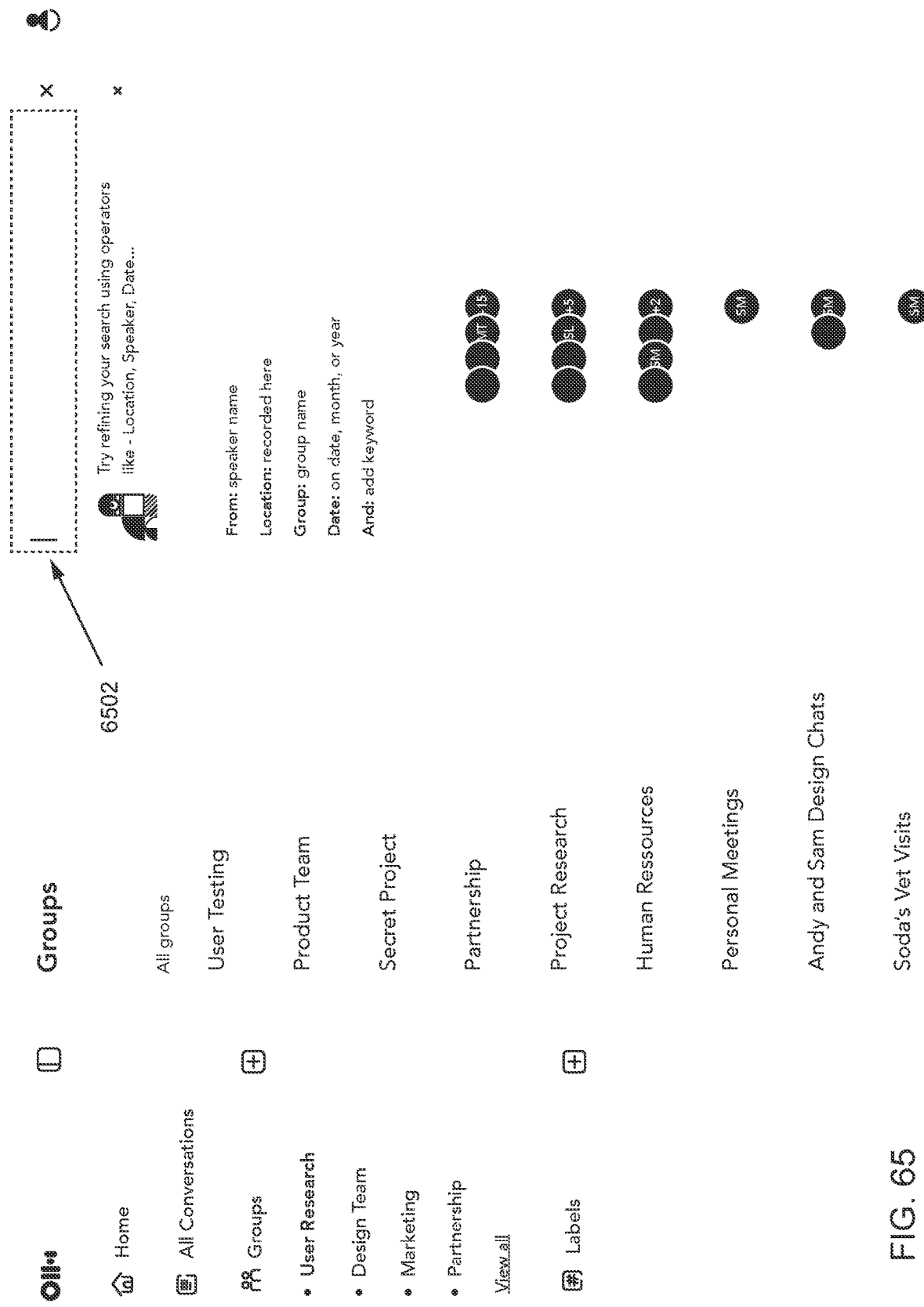
Figure 66:
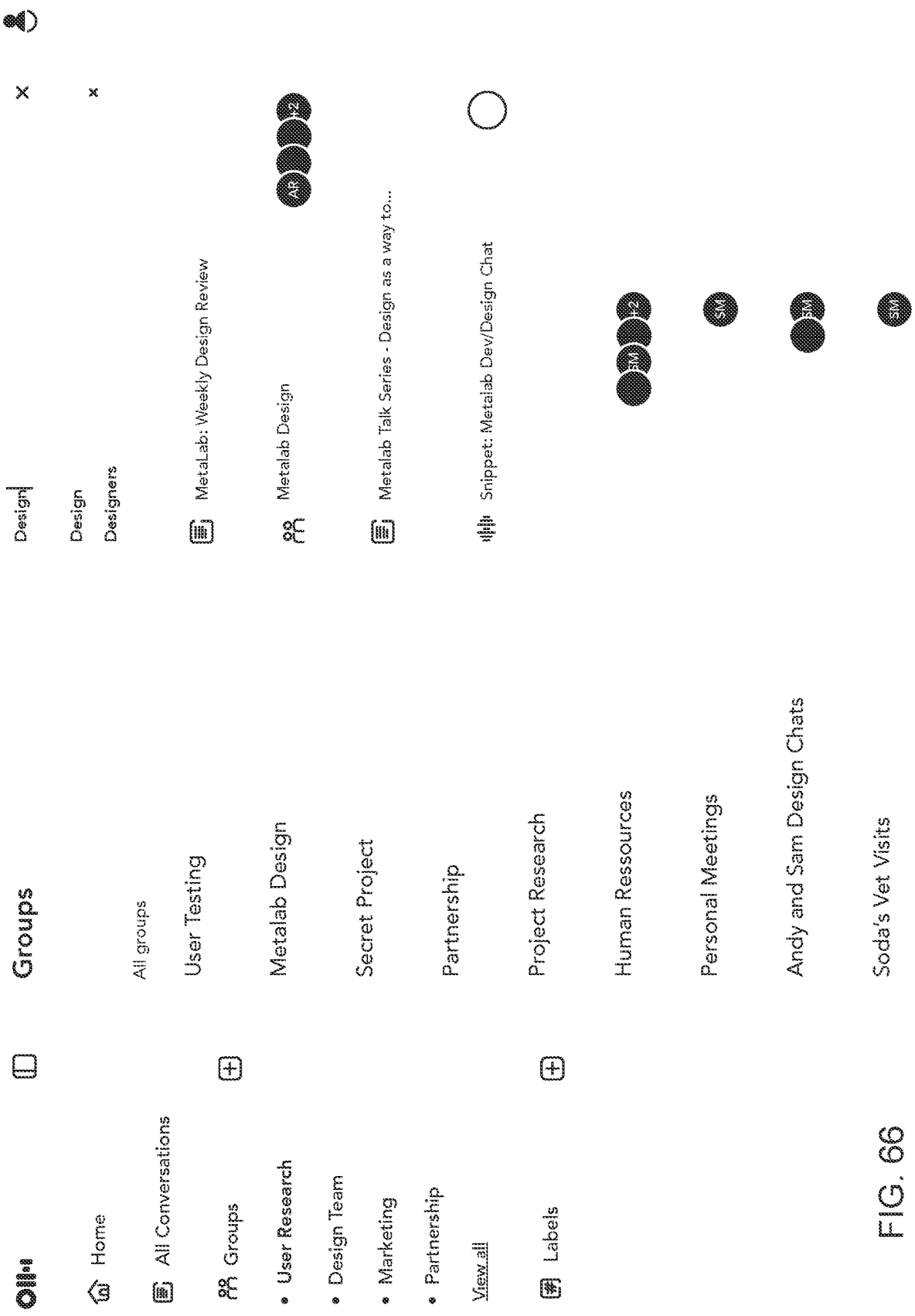
Figure 67:
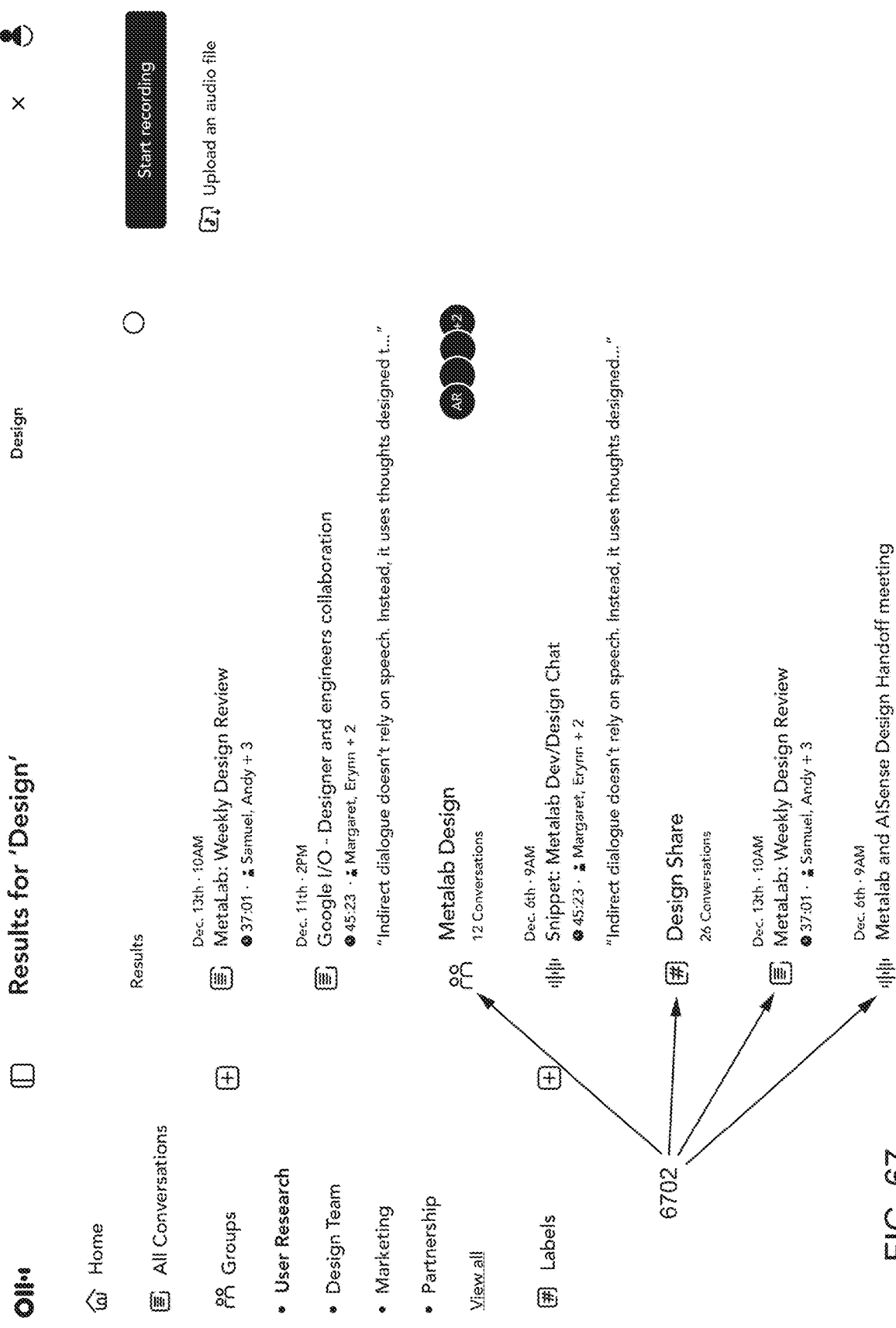
Figure 68:
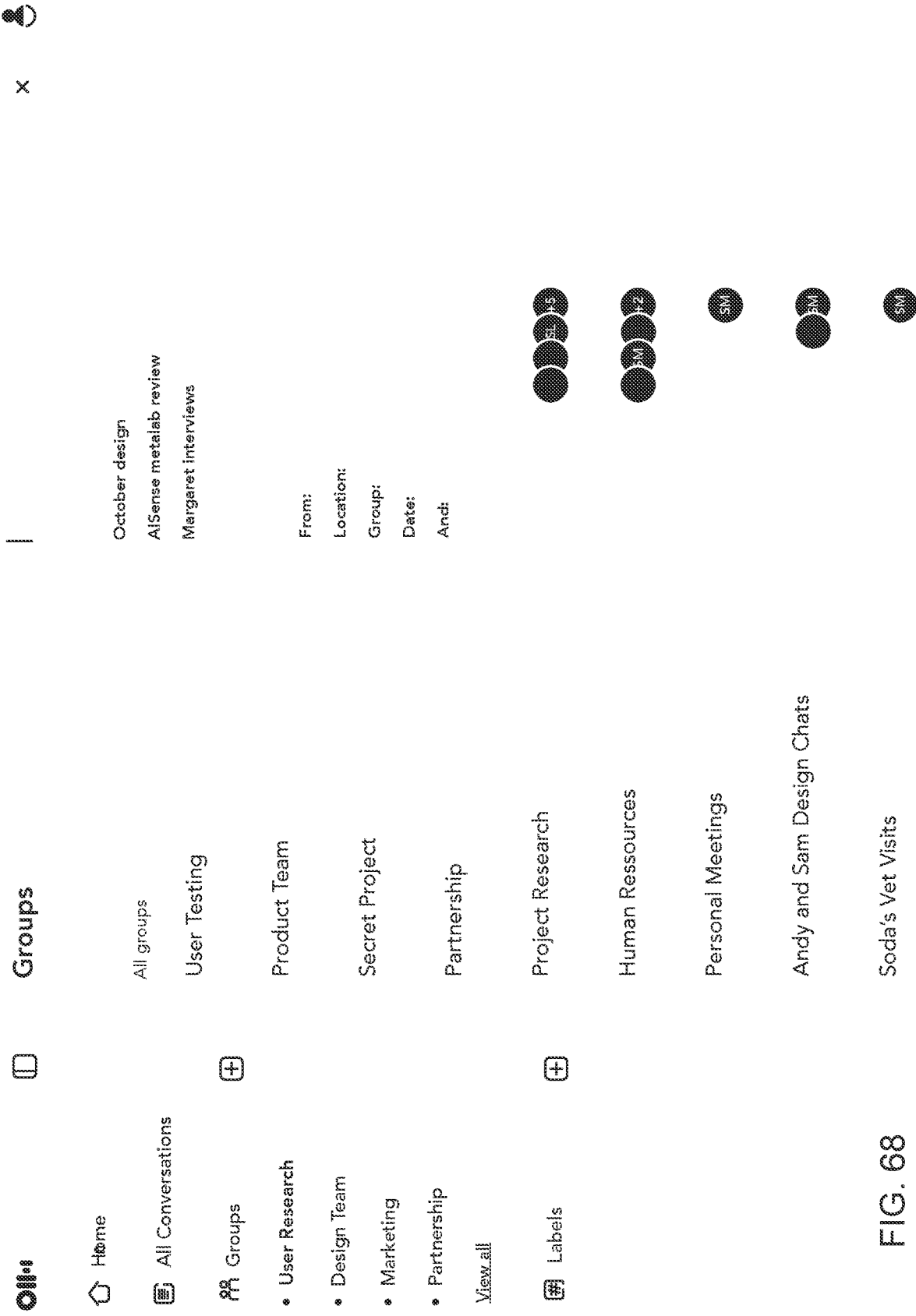
Figure 69:
Figure 70:
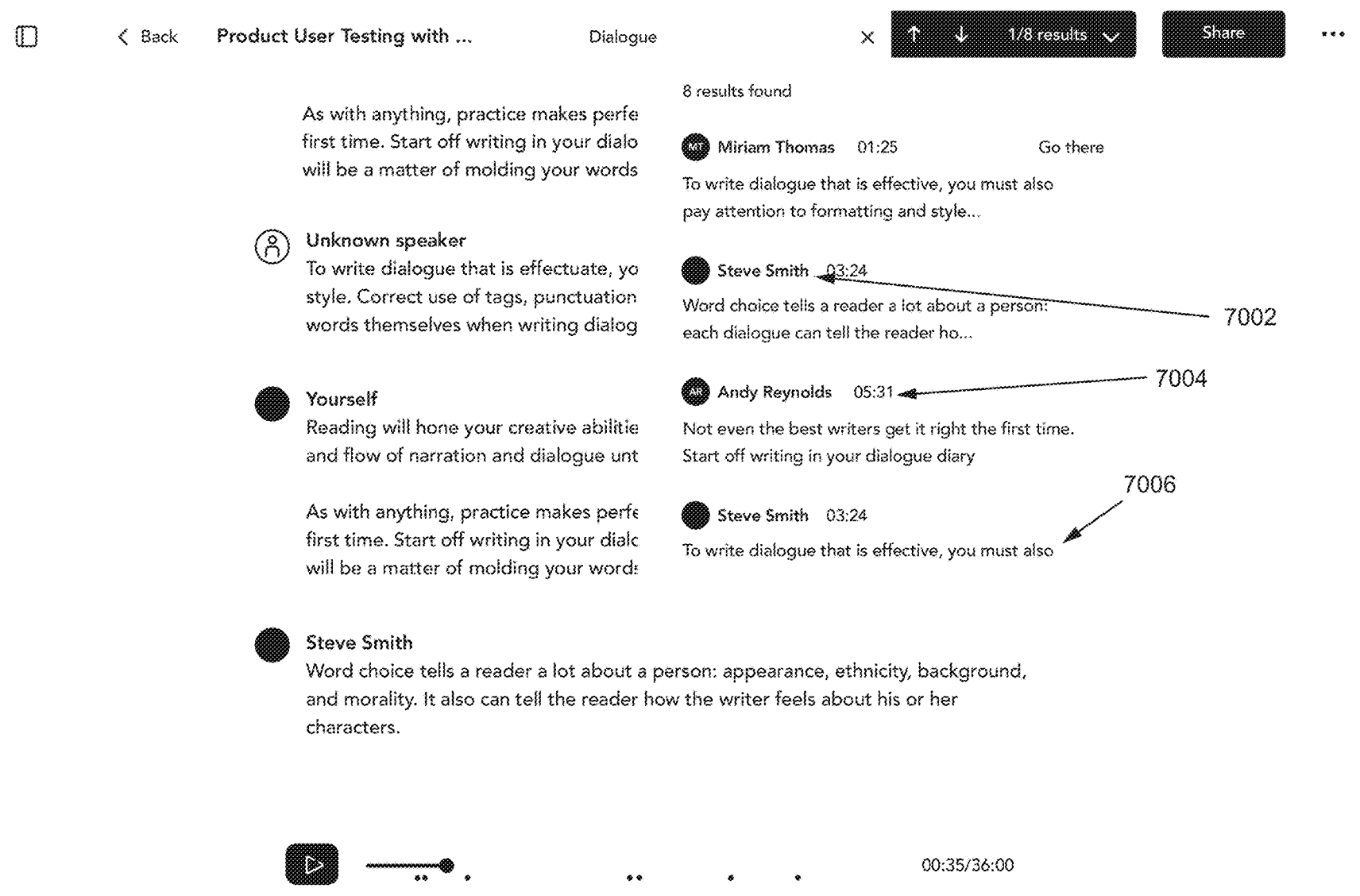
Figure 72:
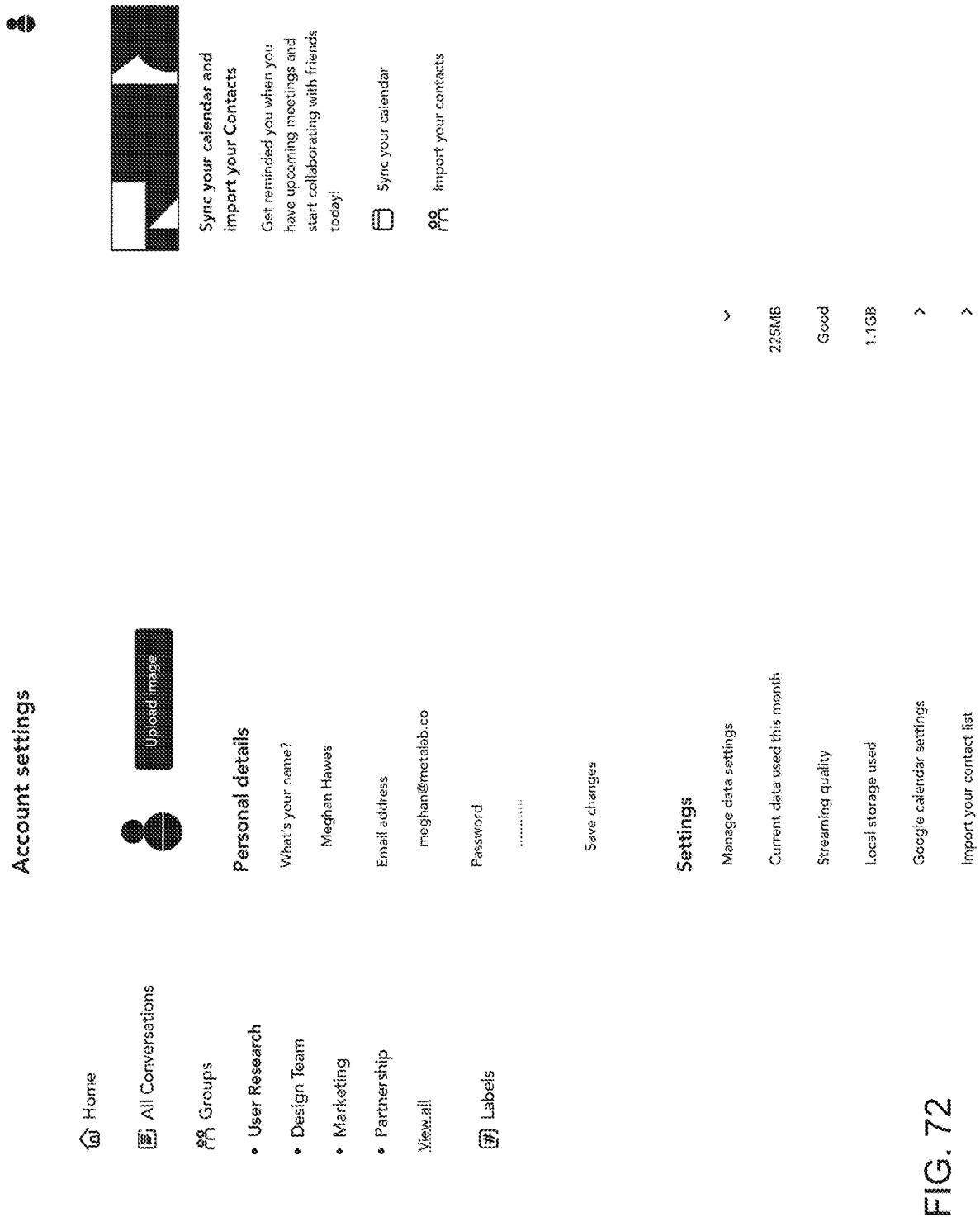
Figure 73:
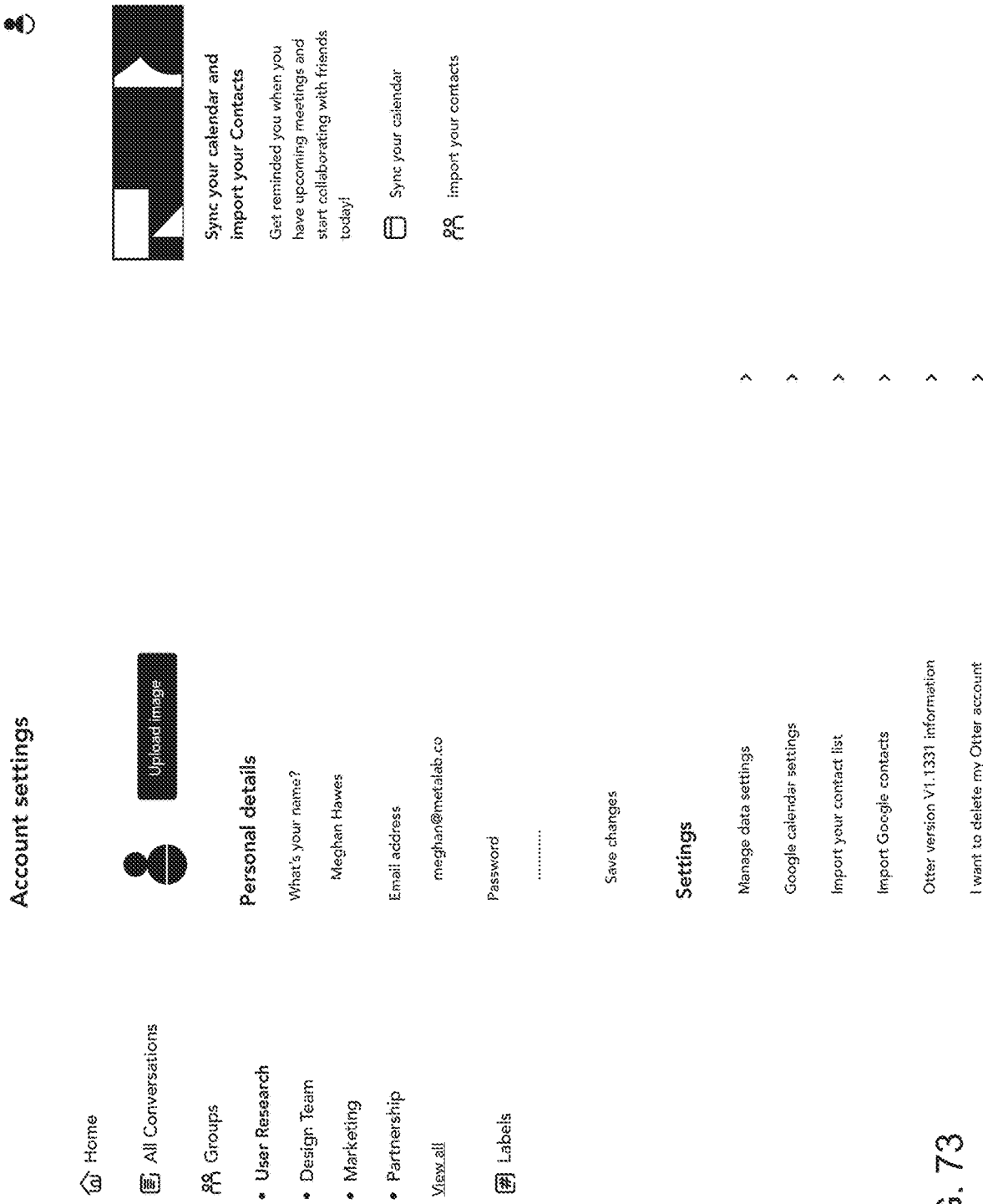
Figure 74:
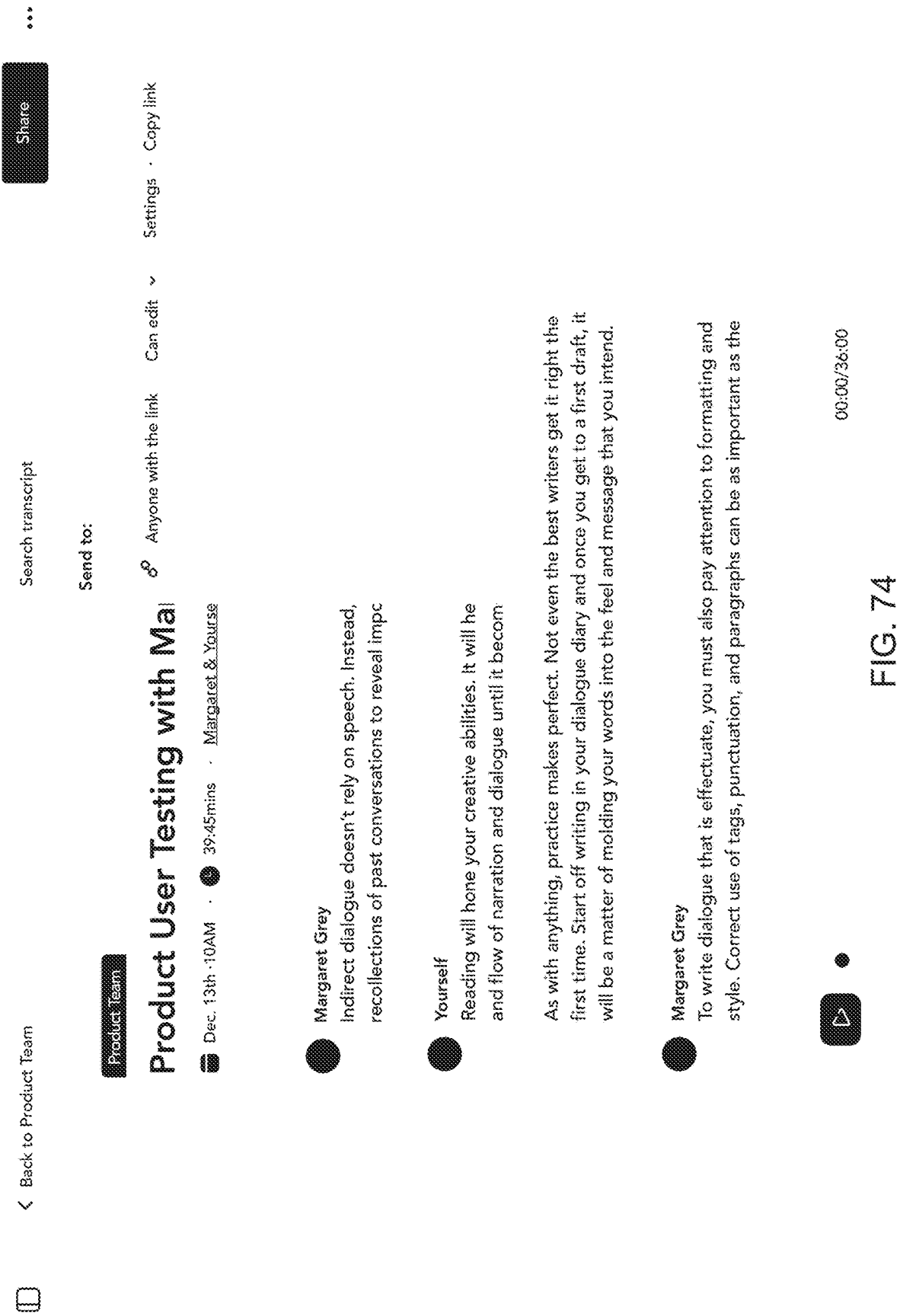

In some examples, search results presented in process 10216 include one or more conversations, one or more snippets, one or more groups, and/or one or more labels (e.g., as shown in FIG. 67). In certain examples, the type of a search result is indicated via a type label 6702, as shown in FIG. 67. In various examples, each search result is associated with a search term input (e.g., entered via a search bar 6502, as shown in FIG. 65). In some embodiments, the search bar 6502 is configured to accept speaker name, location, group name, and/or date (e.g., of recording, of uploading, of transforming, of sharing), as shown in FIG. 65. In some embodiments, a snippet result presented as a search result (e.g., in response to a search term) is presented with the speaker label of the snippet 7002, a timestamp associated with the snippet 7004, and/or at least part of the snippet's text 7006 (e.g., as shown in FIG. 70). In various examples, the system is configured such that activating (e.g., clicking on) a snippet result leads to the conversation containing the snippet result. In certain examples, the system is configured such that activation (e.g., clicking on) a snippet result leads to the conversation containing the snippet result at the timestamp associated with the snippet result.

As discussed above and further emphasized here, FIG. 1, FIG. 2, FIG. 3, and FIG. 102 are merely examples, which should not unduly limit the scope of the claims. One of ordinary skill in the art would recognize many variations, alternatives, and modifications. In some examples, the system as shown in FIG. 1 is used to process and present a speech by a single-speaker and/or a conversation made by a single speaker talking to himself or herself. In certain examples, the method as shown in FIG. 1 is used to process and present a speech by a single-speaker and/or a conversation made by a single speaker talking to himself or herself. In some examples, the process 206 as shown in FIG. 3 is used to automatically transform a speech by a single-speaker and/or a conversation made by a single speaker talking to himself or herself.

FIGS. 4-101 are simplified diagrams showing a user interface and/or a presenter related to FIG. 1, FIG. 2, FIG. 3, and/or FIG. 102, according to some embodiments of the present invention. These diagrams are merely examples, which should not unduly limit the scope of the claims. One of ordinary skill in the art would recognize many variations, alternatives, and modifications.

As shown in FIGS. 4-101, in some examples, the user interface (e.g., the user interface 104) also functions as the presenter (e.g., the presenter 110). In certain examples, one or more of FIGS. 4-101 pertain to a user interface for a web browser, and/or pertain to a user interface for an offline application for a stationary device (e.g., desktop computer, television, display) and/or a portable and/or mobile device (e.g., laptop, display, tablet, mobile phone, and/or vehicles).

In some embodiments, a user interface and/or a presenter of system 100 is navigable and is implemented according to one or more of FIGS. 4-6, 21, 22, 34, and 37-40. In some examples, a user profile of system 100 is configured to be created and configured according to one or more of FIGS. 46-55, 72, and 73. In certain embodiments, grouping of one or more conversations (e.g., conversations presented at process 208) and displaying grouping information are implemented according to one or more of FIGS. 8, 14, 15, 35, 36. In certain examples, labeling of one or more conversations (e.g., conversations presented at process 208) and displaying labeling information are implemented according to one or more of FIGS. 41-45. In some embodiments, editing of a conversation snippet (e.g., of a transformed conversation from process 206) is implemented according to one or more of FIGS. 7, 9, 10-13, 16-20, and 32-33. In various examples, sharing of one or more conversations (e.g., conversations presented at process 208) and displaying sharing status are implemented according to one or more of FIGS. 23-31 and 74-80. In some examples, recording a conversation (e.g., a conversation captured at process 204) and displaying recording status are implemented according to one or more of FIGS. 56-64. In certain examples, performing searches for one or more conversations and presenting search results are implemented according to one or more of FIGS. 65-71. In some examples, FIGS. 81-101 show alternative presentations of one or more user interfaces or presenters shown in FIGS. 4-80.

According to some embodiments, a system for processing and presenting a conversation includes a sensor, a processor, and a presenter. The sensor is configured to capture an audio-form conversation. The processor is configured to automatically transform the audio-form conversation into a transformed conversation. The transformed conversation includes a synchronized text, wherein the synchronized text is synchronized with the audio-form conversation. The presenter is configured to present the transformed conversation including the synchronized text and the audio-form conversation. The presenter is further configured to present the transformed conversation to be navigable, searchable, assignable, editable, and shareable. For example, the system is implemented according to at least FIG. 1, FIG. 2, FIG. 3, and/or FIG. 102.

In some examples, the transformed conversation presented by the presenter is assignable to a group having one or more group members such that access to the transformed conversation is granted to the one or more group members. In certain examples, the one or more group members are automatically granted access to the transformed conversation when the transformed conversation is assigned to the group. The various examples, changes and updates applied to the transformed conversation are viewable to the one or more group members. In various embodiments, the changes and updates applied to the transformed conversation are viewable to the one or more group members in real time. In certain embodiments, each of the one or more group members can at least one of view, edit, and share the transformed conversation. In some embodiments, the transformed conversation is automatically assigned to a group according to conversation data including at least one of date of capture, time of capture, title of the capture, and speaker identity. In some examples, the conversation data is automatically retrieved from a synced calendar by the processor.

In various examples, the transformed conversation presented by the presenter includes one or more editable conversation snippets that are selectively deletable. In certain examples, the transformed conversation presented by the presenter includes one or more editable conversation snippets that are selectively mergeable. In some embodiments, the transformed conversation presented by the presenter includes one or more editable conversation snippets that are selectively hidable. In certain embodiments, the transformed conversation presented by the presenter includes one or more editable conversation snippets each having a speaker label that is assignable and re-assignable.

In certain examples, the transformed conversation presented by the present includes one or more shareable conversation snippets that are selectively shareable. In some examples, the transformed conversation presented by the presenter includes one or more searchable conversation snippets. In some embodiments, a searchable conversation snippet returned as a search result entry in response to a search is configured to lead to the conversation snippet for viewing. In various examples, the sensor is further configured to capture a voiceprint calibration recording to help establish a voiceprint of a user. In certain examples, the presenter is further configured to present a voiceprint calibration script for the user to read to help create the voiceprint calibration recording. In various examples, the sensor is configured to capture a conversation while the presenter presents the conversation.

According to some embodiments, a computer-implemented method for processing and presenting a conversation includes receiving an audio-form conversation; automatically transforming the audio-form conversation into a transformed conversation, the transformed conversation including a synchronized text, the synchronized text being synchronized with the audio-form conversation; and presenting the transformed conversation including the synchronized text and the audio-form conversation. The presenting the transformed conversation including the synchronized text and the audio-form conversation includes presenting the transformed conversation to be navigable, searchable, assignable, editable, and shareable. For example, the computer-implemented method is implemented according to at least FIG. 1, FIG. 2, FIG. 3, and/or FIG. 102.

According to some embodiments, a non-transitory computer-readable medium with instructions stored thereon, that when executed by a processor, perform the processes including: receiving an audio-form conversation; automatically transforming the audio-form conversation into a transformed conversation, the transformed conversation including a synchronized text, the synchronized text being synchronized with the audio-form conversation; and presenting the transformed conversation including the synchronized text and the audio-form conversation. The presenting the transformed conversation including the synchronized text and the audio-form conversation includes presenting the transformed conversation to be navigable, searchable, assignable, editable, and shareable. For example, the non-transitory computer-readable medium is implemented according to at least FIG. 1, FIG. 2, FIG. 3, and/or FIG. 102.

According to various embodiments, a system for presenting a conversation includes a sensor configured to capture an audio-form conversation and send the captured audio-form conversation to a processor. The processor is configured to automatically transform the audio-form conversation into a transformed conversation. The transformed conversation includes a synchronized text. The synchronized text is synchronized with the audio-form conversation. The system further includes a presenter configured to receive the transformed conversation from the processor and present the transformed conversation including the synchronized text and the audio-form conversation. The presenter is further configured to present the transformed conversation to be navigable, searchable, assignable, editable, and shareable. For example, the system is implemented according to at least FIG. 1, FIG. 2, FIG. 3, and/or FIG. 102.

According to certain embodiments, a computer-implemented method for processing and presenting a conversation includes receiving an audio-form conversation; sending the received audio-form conversation to automatically transform the audio-form conversation into a transformed conversation, wherein the transformed conversation includes a synchronized text, that is synchronized with the audio-form conversation; receiving the transformed conversation; and presenting the transformed conversation including the synchronized text and the audio-form conversation, wherein the presenting the transformed conversation including the synchronized text and the audio-form conversation includes presenting the transformed conversation to be navigable, searchable, assignable, editable, and shareable. For example, the computer-implemented method is implemented according to at least FIG. 1, FIG. 2, FIG. 3, and/or FIG. 102.

According to certain examples, a non-transitory computer-readable medium with instructions stored thereon, that when executed by a processor, perform the processes including receiving an audio-form conversation; sending the received audio-form conversation to automatically transform the audio-form conversation into a transformed conversation, the transformed conversation including a synchronized text, the synchronized text being synchronized with the audio-form conversation; receiving the transformed conversation; and presenting the transformed conversation including the synchronized text and the audio-form conversation, wherein the presenting the transformed conversation including the synchronized text and the audio-form conversation includes presenting the transformed conversation to be navigable, searchable, assignable, editable, and shareable. For example, the non-transitory computer-readable medium is implemented according to at least FIG. 1, FIG. 2, FIG. 3, and/or FIG. 102.

According to some examples, a system for transforming a conversation includes a processor configured to receive from a sensor a captured audio-form conversation; automatically transform the audio-form conversation into a transformed conversation, the transformed conversation including a synchronized text, the synchronized text being synchronized with the audio-form conversation; and send the transformed conversation to a presenter configured to present the transformed conversation including the synchronized text and the audio-form conversation, wherein the processor is further configured to send the transformed conversation to the presenter further configured to present the transformed conversation to be navigable, searchable, assignable, editable, and shareable. For example, the system is implemented according to at least FIG. 1, FIG. 2, FIG. 3, and/or FIG. 102.

According to certain examples, a computer-implemented method for transforming a conversation includes receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation, wherein the sending the transformed conversation to present the transformed conversation including the synchronized text and the audio-form conversation includes sending the transformed conversation to present the transformed conversation to be navigable, searchable, assignable, editable, and shareable. For example, the computer-implemented method is implemented according to at least FIG. 1, FIG. 2, FIG. 3, and/or FIG. 102.

According to various examples, a non-transitory computer-readable medium with instructions stored thereon, that when executed by a processor, perform the processes including receiving an audio-form conversation; automatically transforming the audio-form conversation into a transformed conversation, the transformed conversation including a synchronized text, the synchronized text being synchronized with the audio-form conversation; and sending the transformed conversation to present the transformed conversation including the synchronized text and the audio-form conversation, wherein the sending the transformed conversation to present the transformed conversation including the synchronized text and the audio-form conversation includes sending the transformed conversation to present the transformed conversation to be navigable, searchable, assignable, editable, and shareable. For example, the non-transitory computer-readable medium is implemented according to at least FIG. 1, FIG. 2, FIG. 3, and/or FIG. 102.

Various embodiments are related to architecture, flow, and presentation of conversations. For example, certain embodiments include systems, methods, and apparatuses for architecture, flow and presentation of conversations. For at least one embodiment, the conversations include human to human conversations. At least some embodiments include transcribing conversations. At least some embodiments provide searching within the conversations. At least some embodiments include automatic word synchronization which includes synchronization of the audio with the transcript. At least some embodiments include speaker identification. For at least some embodiments, the speaker identification includes a label. For at least some embodiments, the label includes a picture of the speaker.

Some embodiments of the present invention improve speech recognition, diarization and/or speaker-identification (e.g., based on machine learning and/or artificial intelligence). Some examples of the present invention collect a large quantity of speech data and select proper training data which match the end-user speech environment to achieve high speech recognition accuracy, by for example, making speech recognition more resilient to background noise, to far-field speech with lower signal-noise ratio, and/or to various speech accents. Certain examples of the present invention can process a conversation quickly. Some examples of the present invention can separate speeches that are spoken by multiple human speakers. Certain examples of the present invention can process one or more long-form conversation (e.g., a long-form conversation that lasts for several hours) accurately and reliably.

Certain embodiments of the present invention provide excellent user experience and help a broad range of users to improve their daily lives and/or daily work. Some examples of the present invention allow users to avoid taking notes manually (e.g., avoid writing on a paper notebook and/or avoid typing on a computer) so that the users can engage better with other speakers in the conversations and also improve effectiveness of their meetings. Certain examples of the present invention can generate notes for conversations in real time, dramatically reducing turn-around time than by using human transcribers. Some examples of the present invention can dramatically improve enterprise productivity. Certain examples of the present invention can function for in-person meetings, phone calls, and/or video conferences. Some examples of the present invention can automatically generate notes that are digital and searchable. Certain examples of the present invention can automatically generate notes that can be easily shared with colleagues, thus improving collaboration. Some examples of the present invention can help students take lecture notes. Certain examples of the present invention can help deaf students to learn, thus improving their educational experience.

In various examples, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:

1. A computer-implemented method for processing and presenting a conversation, the method comprising:
   receiving an audio-form conversation;
   processing the audio-form conversation;
   automatically generating a group having one or more group members based at least in part on one of a date of capture, a time of the capture, a title of the capture, and a speaker identity associated with the processed audio-form conversation;
   automatically assigning the processed audio-form conversation to the group such that access to the processed audio-form conversation is granted to the one or more group members; and
   presenting the processed audio-form conversation to the group members.

2. The method of claim 1, wherein the processing the audio-form conversation includes segmenting the audio-form conversation based on one or more speakers change detections.

3. The method of claim 2, further comprising automatically generating one or more segments of the audio-form conversation when a speaker change occurs or a natural pause occurs such that each segment of the one or more segments of the audio-form conversation is spoken by only one speaker.

4. The method of claim 3, further comprising automatically assigning only one speaker label to each segment of the processed audio-form conversation, each one speaker label representing one speaker.

5. The method of claim 1, wherein the automatically generating a group having one or more group members comprises automatically generating a group by identifying one or more group members who are in a conversation associated with a calendar event of a synced calendar.

6. The method of claim 1, wherein the automatically generating a group having one or more group members comprises automatically generating a group by identifying one or more group members based on contacts or an address book of the one or more group members.

7. The method of claim 1, further comprising automatically assigning one or more labels to the processed audio-form conversation,
   wherein the presenting the processed audio-form conversation includes presenting the processed audio-form conversation with the one or more assigned labels.

8. A system for processing and presenting a conversation, the system comprising:
   a sensor configured to receive an audio-form conversation;
   a processor configured to:
      process the audio-form conversation;
      automatically generate a group having one or more group members based at least in part on one of a date of capture, a time of the capture, a title of the capture, and a speaker identity associated with the processed audio-form conversation;
      automatically assign the processed audio-form conversation to the group such that access to the processed audio-form conversation is granted to the one or more group members; and
   a presenter configured to present the processed audio-form conversation to the group members.

9. The system of claim 8, wherein the processing the audio-form conversation includes segmenting the audio-form conversation based on one or more speakers change detections.

10. The system of claim 9, wherein the processor is further configured to automatically generate one or more segments of the audio-form conversation when a speaker change occurs or a natural pause occurs such that each segment of the one or more segments of the audio-form conversation is spoken by only one speaker.

11. The system of claim 9, wherein the processor is further configured to automatically assigning only one speaker label to each segment of the processed audio-form conversation, each one speaker label representing one speaker.

12. The system of claim 8, wherein to automatically generate a group having one or more group members comprises to automatically generate a group by identifying one or more group members who are in a conversation associated with a calendar event of a synced calendar.

13. The system of claim 8, wherein to automatically generate a group having one or more group members comprises to automatically generate a group by identifying one or more group members based on contacts or an address book of the one or more group members.

14. The system of claim 8, wherein the processor is further configured to automatically assigning one or more labels to the processed audio-form conversation,
   wherein to present the processed audio-form conversation includes to present the processed audio-form conversation with the one or more assigned labels.

* * * * *